US010414555B2

(12) United States Patent
Steinmann et al.

(10) Patent No.: US 10,414,555 B2
(45) Date of Patent: Sep. 17, 2019

(54) PORTABLE BEVERAGE CONTAINER

(71) Applicant: Hydrovaze LLC, Laguna Niguel, CA (US)

(72) Inventors: Hardy Steinmann, Laguna Niguel, CA (US); James Steven Keith Pelletier, Laguna Niguel, CA (US)

(73) Assignee: HYDROVAZE LLC, Laguna Niguel, CA (US)

( * ) Notice: Subject to any disclaimer, the term of this patent is extended or adjusted under 35 U.S.C. 154(b) by 0 days.

(21) Appl. No.: 15/586,160

(22) Filed: May 3, 2017

(65) Prior Publication Data
US 2017/0320640 A1 Nov. 9, 2017

Related U.S. Application Data

(60) Provisional application No. 62/331,911, filed on May 4, 2016.

(51) Int. Cl.
B65D 47/08 (2006.01)
B65D 1/02 (2006.01)
(Continued)

(52) U.S. Cl.
CPC .......... B65D 47/0828 (2013.01); A47J 41/00 (2013.01); B65D 1/0207 (2013.01); B65D 25/48 (2013.01);
(Continued)

(58) Field of Classification Search
CPC ...... B65D 1/0207; B65D 23/00; B65D 25/48; B65D 41/005; B65D 41/62; B65D 43/16;
(Continued)

(56) References Cited

U.S. PATENT DOCUMENTS 5,242,093 A * 9/1993 Worrell .................. A47G 19/12
222/470
6,419,108 B1 7/2002 Toida et al.
(Continued)

FOREIGN PATENT DOCUMENTS

CN 2088427 U 11/1991
CN 101579170 A 11/2009
(Continued)

OTHER PUBLICATIONS

International Search Report and Written Opinion from PCT/US2017/030914 dated Sep. 13, 2017.

Primary Examiner — Paul R Durand
Assistant Examiner — Andrew P Bainbridge
(74) Attorney, Agent, or Firm — Morgan, Lewis & Bockius LLP

(57) ABSTRACT

A portable beverage container is provided. The portable beverage container may include a glass vessel having a neck; a metal outer shell configured to surround a first portion of the glass vessel; a cap configured to engage with the metal outer shell to surround a second portion of the glass vessel; and an amorphous thermoplastic spout having a neck configured to be inserted through an opening in the cap and into the neck of the glass vessel. The spout may be configured to securely engage with the cap. The cap may include a lid with an elastomeric sealing member having a knob configured to extend into a recess in the spout and a recess configured to wrap around and over a lip of the spout. The spout may be removable from the cap while the cap is engaged with the outer shell.

32 Claims, 34 Drawing Sheets

(51) Int. Cl.
*B65D 25/48* (2006.01)
*B65D 41/00* (2006.01)
*B65D 43/16* (2006.01)
*B65D 43/22* (2006.01)
*B65D 53/02* (2006.01)
*A47J 41/00* (2006.01)

(52) U.S. Cl.
CPC ............ *B65D 41/005* (2013.01); *B65D 43/16* (2013.01); *B65D 43/22* (2013.01); *B65D 53/02* (2013.01)

(58) Field of Classification Search
CPC .... B65D 43/22; B65D 47/08; B65D 47/0828; B65D 53/02; B65D 81/38; B65D 81/3802; A47J 41/00
USPC ...... 222/131, 153.1, 154–159, 183, 511–518, 222/540, 544–564, 566–574
See application file for complete search history.

(56) References Cited

U.S. PATENT DOCUMENTS

| | | | | |
|---|---|---|---|---|
| 6,702,137 | B1* | 3/2004 | Kowa | A47J 41/0027 215/235 |
| 6,702,138 | B1* | 3/2004 | Bielecki | A47G 19/2272 220/254.9 |
| 7,163,127 | B2* | 1/2007 | Seelhofer | B65D 47/0804 222/83 |
| 7,306,113 | B2 | 12/2007 | Ei-Saden et al. | |
| 8,225,957 | B1 | 7/2012 | Volan | |
| 8,550,269 | B2* | 10/2013 | Lane | B65D 47/066 215/229 |
| 8,596,480 | B2 | 12/2013 | Arjomand | |
| 8,622,229 | B2* | 1/2014 | Lane | B65D 43/26 215/245 |
| 8,684,223 | B1 | 4/2014 | Kalamaras | |
| 8,688,106 | B2* | 4/2014 | Hapsari | H04W 24/10 455/422.1 |
| 8,689,989 | B2* | 4/2014 | Lane | A45F 3/16 215/237 |
| 8,844,742 | B2* | 9/2014 | Fujita | A47G 19/2266 215/307 |
| 8,978,906 | B2 | 3/2015 | Feeley et al. | |
| 8,985,370 | B2 | 3/2015 | Lane | |
| 9,022,239 | B2* | 5/2015 | Mackenzie | B65D 47/0871 215/244 |
| 9,211,040 | B2 | 12/2015 | Lane | |
| 9,307,853 | B2 | 4/2016 | Melton | |
| 2002/0036207 | A1* | 3/2002 | Ohuo | A47G 19/2266 220/830 |
| 2005/0211712 | A1* | 9/2005 | Moran | A47J 41/0011 220/592.17 |
| 2006/0255035 | A1 | 11/2006 | Lin | |
| 2008/0169297 | A1 | 7/2008 | Kelly | |
| 2013/0119075 | A1* | 5/2013 | Justiss | B65D 25/00 220/660 |
| 2013/0175234 | A1 | 7/2013 | Mackenzie et al. | |
| 2013/0233178 | A1* | 9/2013 | Herling | A47J 31/18 99/322 |
| 2014/0174965 | A1* | 6/2014 | Herling | A47J 31/18 206/216 |
| 2014/0175042 | A1 | 6/2014 | Lane | |
| 2014/0312077 | A1* | 10/2014 | Tajima | B65D 47/30 222/552 |
| 2014/0332440 | A1 | 11/2014 | Marcus et al. | |
| 2015/0034659 | A1* | 2/2015 | Chen | B65D 81/3879 220/592.24 |
| 2015/0069065 | A1 | 3/2015 | Lohn | |
| 2015/0216343 | A1 | 8/2015 | Price | |
| 2015/0223628 | A1 | 8/2015 | Cheung et al. | |
| 2017/0320640 | A1* | 11/2017 | Steinmann | A47J 41/00 |

FOREIGN PATENT DOCUMENTS

| | | |
|---|---|---|
| CN | 104276355 A | 1/2015 |
| JP | 2011-251754 | 12/2011 |
| JP | 2015-013673 | 1/2015 |

* cited by examiner

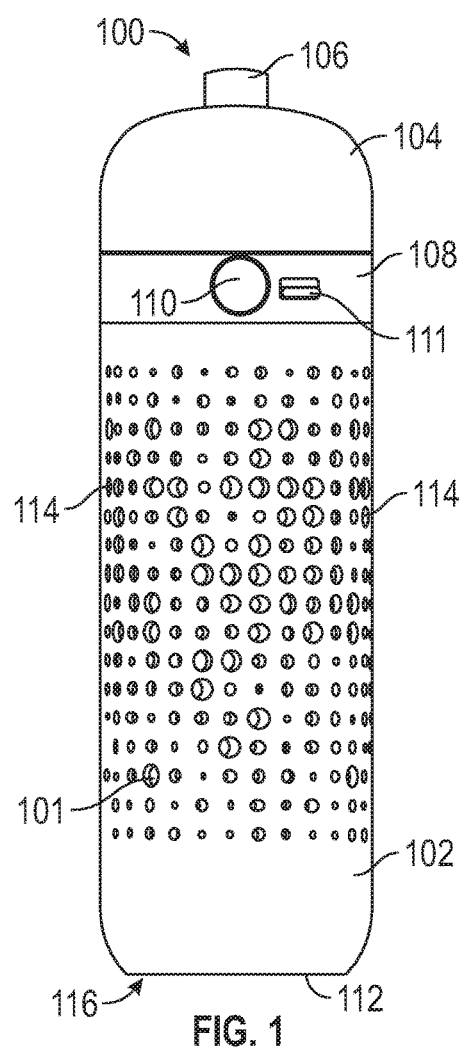
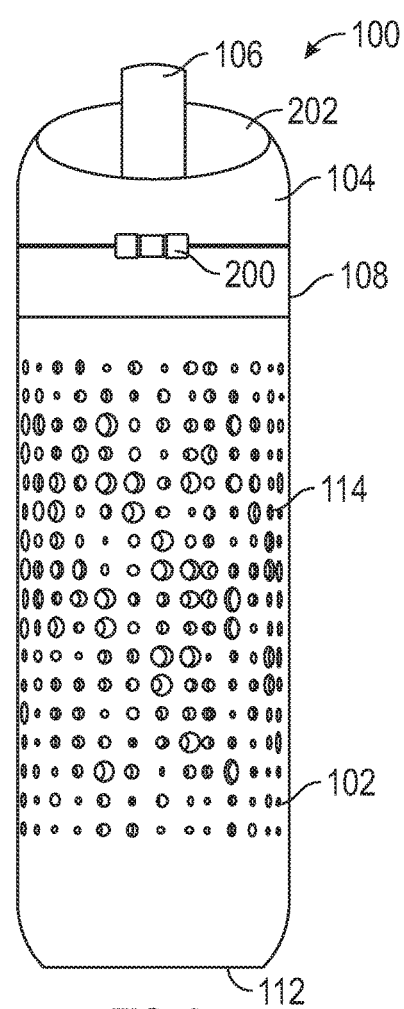
FIG. 1
FIG. 2

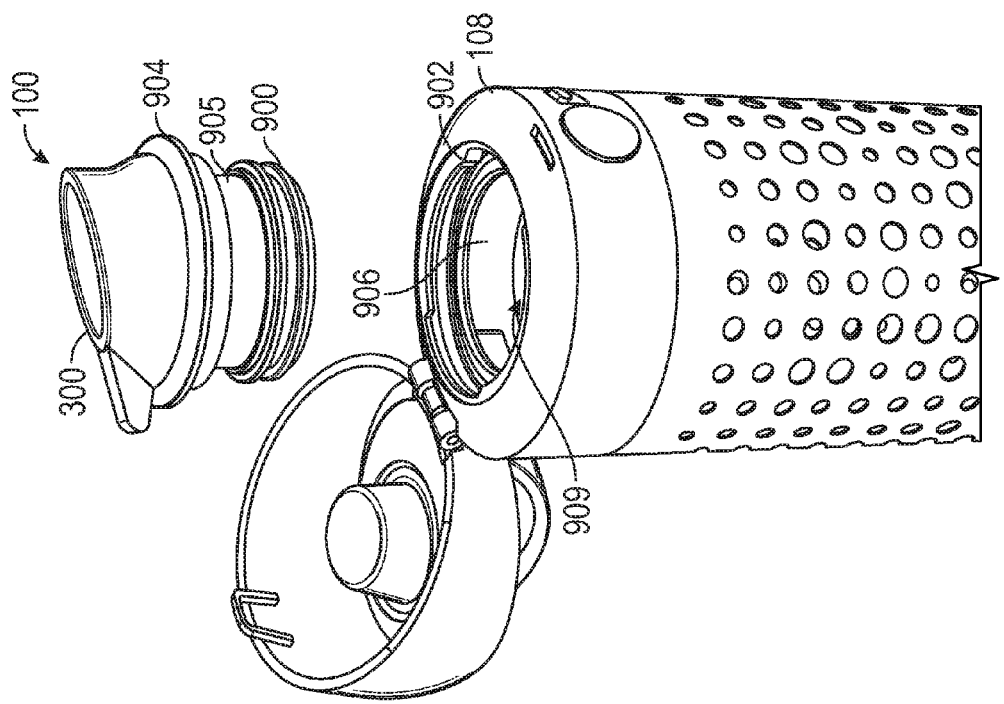
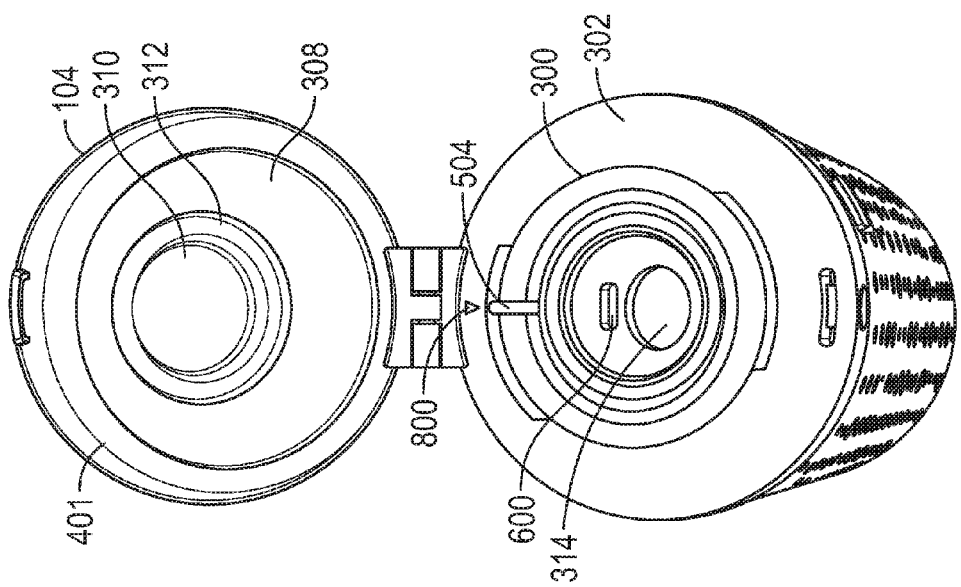

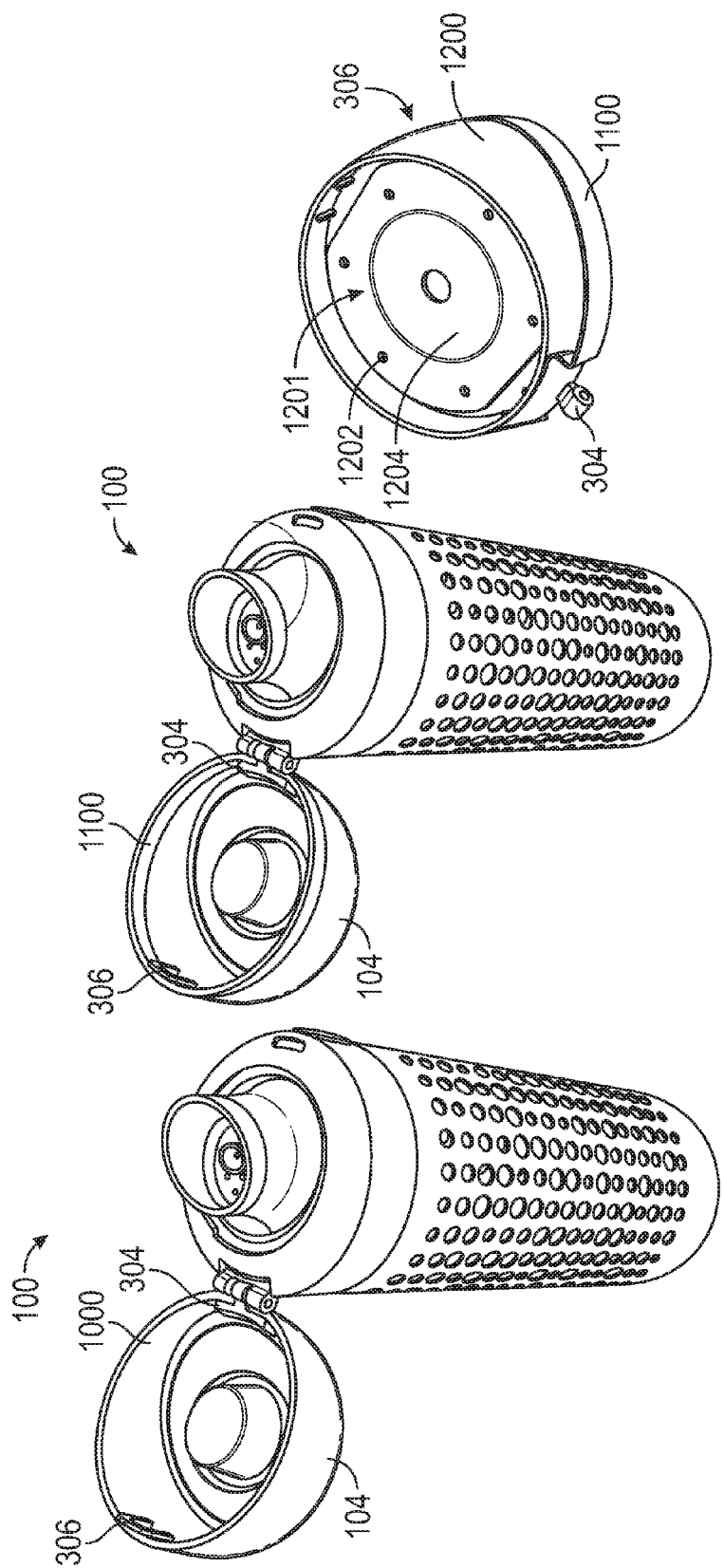

PORTABLE BEVERAGE CONTAINER

CROSS-REFERENCE TO RELATED APPLICATIONS

This application claims the benefit of priority under 35 U.S.C. § 119 from U.S. Provisional Patent Application 62/331,911 filed May 4, 2016, which is incorporated herein by reference in its entirety.

BACKGROUND

The present disclosure relates generally to containers for liquid and, more particularly, to portable beverage containers.

SUMMARY

The disclosed subject matter relates to portable beverage containers.

In some implementations, the disclosed subject matter can be embodied in a portable beverage container having a glass vessel having a neck; a metal outer shell configured to surround a first portion of the glass vessel; a cap configured to engage with the metal outer shell to surround a second portion of the glass vessel; and an amorphous thermoplastic spout having a neck configured to be inserted through an opening in the cap and into the neck of the glass vessel, where the spout is configured to securely engage with the cap.

In some implementations, the disclosed subject matter can be embodied in a portable beverage container having a rigid outer shell; a cap that includes: a base configured to engage with the rigid outer shell, and a lid coupled to the base by a hinge, where the lid comprises an elastomeric sealing member on an internal surface thereof, the elastomeric sealing member including: a knob that protrudes from the internal surface, and a recess that runs around the knob; an inner vessel configured to be secured within the rigid outer shell and the cap; and a spout configured to securely engage with the cap, where the spout includes: a recess having an opening that is configured to be fluidly coupled to the inner vessel; and a lip surrounding the recess, where, in a closed position for the lid, the knob is sealingly disposed within the recess of the spout and the recess of the elastomeric sealing member wraps around and over the lip of the spout.

In some implementations, the disclosed subject matter can be embodied in a portable beverage container having: a rigid outer shell; a glass inner vessel configured to be disposed at least partially within the rigid outer shell; a cap configured to be secured to the rigid outer shell; and a spout configured to be engaged with the cap and to extend through an opening in the cap into a neck of the glass inner vessel, where the spout is removable from the cap while the cap is secured to the rigid outer shell.

In some implementations, the disclosed subject matter can be embodied in a portable beverage container having: a rigid outer shell; a glass inner vessel configured to be disposed at least partially within the rigid outer shell, the glass inner vessel having a neck and a base; an upper shock absorber disposed around the neck of the glass inner vessel and disposed between a first portion of the glass inner vessel and a corresponding first portion of the rigid outer shell; and a lower shock absorber, where the base of the glass inner vessel is configured to rest in the lower shock absorber, and where a portion of the lower shock absorber is configured be disposed between a second portion of the glass inner vessel and a corresponding second portion of the rigid outer shell.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

FIG. 1 is a diagram of a front view of an example portable beverage container in accordance with some implementations of the subject technology.

FIG. 2 is a diagram of a rear view of an example portable beverage container in accordance with some implementations of the subject technology.

FIG. 8 is a diagram of a top front perspective view of an example portable beverage container with an open lid in accordance with some implementations of the subject technology.

FIG. 9 is a diagram of a top front-side perspective view of an example portable beverage container with an open lid and a removed spout in accordance with some implementations of the subject technology.

FIG. 10 is a diagram of a side perspective view of an example portable beverage container with an open lid in accordance with some implementations of the subject technology.

FIG. 11 is a diagram of a side perspective view of an example portable beverage container with an open lid shown in semi-transparency in accordance with some implementations of the subject technology.

FIG. 12 is a diagram of a perspective view of a lid member for a portable beverage container, the lid member shown in semi-transparency in accordance with some implementations of the subject technology.

DETAILED DESCRIPTION

Figure 3:
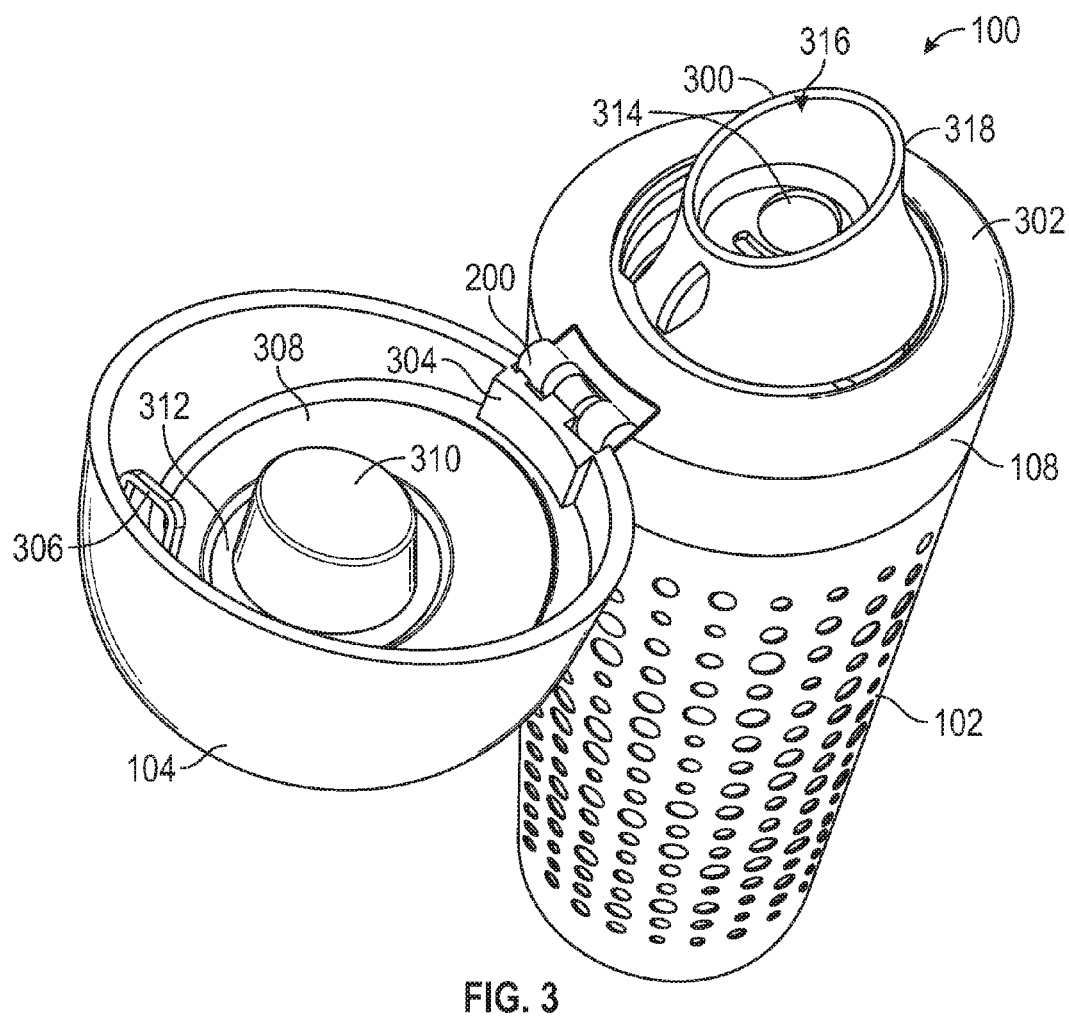
FIG. 3 is a diagram of a top perspective view of an example portable beverage container with an open lid in accordance with some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

The disclosed implementations include a portable beverage container having an outer shell, a cap, an inner vessel, and a spout. The outer shell, the cap, the inner vessel, and the spout may be easily separable for easy cleaning or replacement of all components. In an assembled configuration for the portable beverage container, the inner vessel may be resiliently secured within the outer shell by the outer shell, the cap, and the spout to provide shock absorption for the inner vessel. In this way, the use of materials for the inner vessel (e.g., glass) that may be helpful for storing liquids, hygienically and without chemical contamination, can be facilitated.

As described in further detail hereinafter, the shape, materials, and assembled arrangement of the portable beverage container may provide a more hygienic drinking container that reduces or eliminates various features that can allow growth of mold or other contaminants on or within the container or its components, relative to existing containers. In this way, a hygienic portable beverage container may be provided, along with other advantageous container features as described herein. The shape, materials, and assembled arrangement of the portable beverage device may also provide a more durable drinking container that is less susceptible to damage than existing containers.

FIG. 1 shows a front view of a portable beverage container 100 in accordance an embodiment. As shown in FIG. 1, container 100 may have a "bullet-shaped" outer profile and may include an outer shell 102 (sometimes referred to herein as an outer sleeve, a shell, or a sleeve) and a cap 108. Inner vessel 101 can be seen through some of openings 114 in outer shell 102. As shown, cap 108 may include a lid 104 and a handle 106. In the example of FIG. 1, container 100 is shown in an assembled configuration with a closed lid.

In various implementations, inner vessel 101 may be a glass vessel, a plastic vessel, a metal vessel, or a vessel formed from a combination of these or other materials. For example, vessel 101 may be formed entirely from glass or may be formed from other materials such as Tritan™, or a transparent, thermoplastic polyamide that is based on aliphatic, cycloaliphatic and aromatic components (e.g., Grilamid® plastic). Inner vessel 101 may have a neck. Outer shell 102 may be configured to surround at least a first portion of the inner vessel 101 such that cap 108 is configured to engage with the outer shell 102 (e.g., by screwing cap 108 onto the outer shell) to surround a second portion of the inner vessel 101. In this way, inner vessel 101 may be substantially disposed within outer shell 102 and cap 108.

Cap 108 may include an opening mechanism with a button 110 and a locking mechanism having a switch 111 visible in the front view of FIG. 1. As shown, button 110 and switch 111 may be disposed on a sidewall of cap 108. Switch 111 may, for example, be a toggle switch that, in a locked position, prevents actuation of button 110, thereby preventing inadvertent opening of lid 104 and/or spillage of a liquid inside the container. In some embodiments, switch 111 may extend (protrude) further from the outer sidewall surface than button 110 so that, even in an unlocked position, switch 111 may prevent actuation of button 110 if container 100 falls over in the direction of button 110.

The opening mechanism for container 100, which may include button 110, internal structures, and one or more hinge features, may provide a relatively slow opening operation for lid 104 to prevent a quick "popping" open of lid 104 which can allow hot gasses accumulated within the container to quickly escape and risk causing injury or discomfort to a user. For example, pressing button 110 may initiate a two-stage opening process that allows pressurized gas to escape safely and diffusely before lid 104 is fully opened. The two-stage opening process may include opening motions at two or more different speeds, opening motions with speed gradient, or continuous opening motion that is sufficiently slow that portions of lid 104 cooperate with portions of an internal spout to control the release of gasses as described in further detail hereinafter. Button 110 may have a curved outer shape. Switch 111 may be implemented as an oval or rectangular bar for locking and unlocking of the opening mechanism.

In one embodiment, outer shell 102 is formed from aluminum. For example, outer shell 102 may be formed from anodized aluminum or double anodized aluminum. However, this is merely illustrative. In other embodiments, outer shell 102 may be formed from other rigid materials such as metals other than aluminum (e.g., steel) or plastic. In the example of FIG. 1, outer shell 102 includes a plurality of openings 114 disposed in a cylindrical portion of the outer shell and may include an inward curved portion 116 at a bottom side.

Outer shell 102 may form an aluminum sleeve perforated with different size round holes as shown in FIG. 1. However, the round shape of holes 114 in FIG. 1 is merely illustrative and other openings are contemplated such as square openings, heart-shaped openings, letter-shaped openings or a combination of different shaped openings of various size (as examples). In some implementations, outer shell 102 may be a solid outer shell without openings in the cylindrical portion.

Outer shell 102 may, for example, be formed by cutting a cylindrical (e.g., aluminum) tube, perforating the cut cylindrical tube (e.g., by laser cutting or other methods) to form openings 114 and bending inward an end of the cut tube (or adding, by welding for example, a cup-shaped bottom portion) to form inwardly curved portion 116, and anodizing the perforated and curved cut tube. However, this is merely illustrative. In other embodiments, outer shell 102 may be formed by perforating sheet metal (e.g., a sheet of aluminum) to form openings 114, cutting the perforated sheet metal, rolling the perforated cut sheet metal to form a cylinder with an inwardly curved edge portion, and welding (e.g., seamlessly welding) rolled edges of the cylinder to form the outer shell. In yet other embodiments, outer shell 102 may be formed from molded plastic or other materials. Outer shell 102 may be rigid and spaced apart from the inner vessel 101 so that a user can handle outer shell 102 without conductive heat transfer between the user's hand and inner vessel 101. In various embodiments, inner vessel may be a glass bottle.

In various implementations, cap 108 may be formed from glass, metal, and/or a polymer material such as plastic (as examples). Cap 108 may be screwed onto, and off of, outer shell 102 (e.g., using a threaded interface as described in further detail hereinafter).

As shown in FIG. 1, container 100 may include a foot 112 such as a rubber, elastomeric, or plastic foot that protrudes from the bottom of outer shell 102 to provide a bottom surface for container 100. In this way, a foot may be provided for container 100. Foot 112 may be formed from a non-slip material (e.g., rubber or other elastomeric materials) that prevents sliding or skidding of the container on a smooth surface. However, this is merely illustrative. In some implementations, foot 112 may be formed from a rigid material such as hard plastic that allows sliding of container 100 on a smooth surface. In some implementations, non-slip and slip feet may be interchangeably provided for container 100. As discussed in further detail hereinafter, foot 112 may be internally connected to shock absorption structures (e.g., a silicone or Poron® foam cup) for inner vessel 101.

FIG. 2 shows a rear view of portable beverage container 100. As shown in FIG. 2, cap 108 may include a hinge (e.g., a metal hinge such as a steel hinge or an aluminum hinge) for lid 104. Hinge 204 may protrude from cap 108 or may be recessed within cap 108. Handle 106 may be an arced handle disposed over a top platform 202 of lid 104. Top platform 202 of lid 104 may have a concave curved surface (e.g., an indented surface) to allow space for a user's fingers between handle 106 and platform 202 for easy and secure lifting and carrying of container 100.

Figure 4:
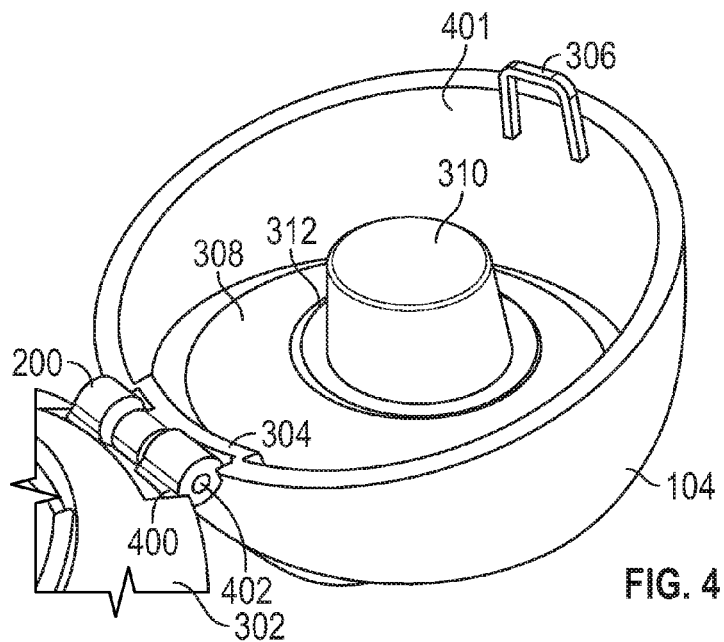
FIG. 4 is a diagram of a top rear-side perspective view of an example lid for a portable beverage container in accordance with some implementations of the subject technology.

FIG. 3 shows a top perspective view of portable beverage container 100 in which lid 104 is in an open position. As shown in FIG. 4, container 100 may include a transparent spout 300 having a central recess 316 and one or more openings such as 314 within recess 316. Spout 300 may be formed from glass or other transparent rigid materials such as Tritan™ or a transparent, thermoplastic polyamide that is based on aliphatic, cycloaliphatic and aromatic components (e.g., Grilamid® plastic). In this way, spout 300 may be formed from a monolithic contaminant-resistant, easily-cleanable material that prevents buildup of bacteria, mold, or other undesirable substances.

In the arrangement shown in FIG. 3, spout 300 is engaged with base 302 of cap 108 and base 302 is engaged with outer shell 102. However, spout 300 may be removable from base 302 to allow easy cleaning and/or replacement of spout 300 and/or for filling or emptying of inner vessel 101. For example, spout 300 may be removed by turning spout 300 with respect to base 302 to unlock and/or unscrew spout 300 from base 302. In this way, spout 300 may be removable whether or not cap 108 is engaged with outer shell 102. Moreover, in this way, access may be provided to inner vessel 101 without removal of cap 108.

As shown in FIG. 3, lid 104 may include an elastomeric sealing member 308 inlaid on an inner surface of the lid. In the example of FIG. 3, elastomeric sealing member 308 includes an inlay knob 310 that protrudes from the inner surface of the lid and a recess 312 that runs around the knob 310. When lid 104 is rotated about hinge 200 to close the lid, knob 310 is configured to sealingly engage with some or all of the inner surface of recess 316 in spout 300 to seal opening 314 for spill and leak proof performance of spout 300 when lid 104 is in a closed position. In this way, the drop down knob 310 feeds into recess 316 of spout 300 to ensure the leak and spill proof performance. Moreover, recess 312 may be configured to wrap around and over lip 318 of spout 300 to further ensure the leak and spill proof performance in the closed position for lid 104.

Upon opening of lid 104 (e.g., by pressing button 110 of FIG. 1 to allow lid 104 to rotate about hinge 200 from the closed position to an open position), the release of knob 310 from the spout may trigger, for example, a two-step opening process. The two-step opening process first allows the lid to move from the closed position to an intermediate position between the closed position and the opening position such that the outermost surface of knob 310 is separated from the inner surface of recess 316 to unseal opening 314 while knob 310 is still substantially disposed within recess 316. In this way, any built-up pressure in inner vessel 101 (e.g., pressure created by evaporation of a hot liquid), can be released through opening 314 when no direct path out of cap 108 to the user exists. Instead, upon opening of the cap, any released gas from inner vessel 101 is directed along the sidewalls of knob 310 between the knob and the spout, and redirected by recess 312, thereby dispersing and slowing the released gas into the cap before release of any gas into the external environment.

The two-step opening process then allows knob 310 to fully exit recess 316, after release of any pressurized gas, and move to the open position to provide the user with drinking access to the spout. Opening 314 in spout 300 may be fluidly coupled to the inner cavity of inner vessel 101 in which drinking fluids may be stored.

The two-step opening process may be provided, in one example, by a mechanism such as hinge 200 having a spring that recoils to provide an opening force to lid 104, the spring having a sufficiently slow recoil that gas from the inner vessel can escape as controlled by knob 310, recess 312, and spout 300 before the entire length of knob 310 has excited recess 316. In another example, hinge 200 may include a multi-spring mechanism in which two or more springs combine to provide a first recoil, at a first recoil speed, to partially open lid 104 quickly to a first position in which knob 310 is at least partially disposed within recess 316 and a second recoil, at a second, slower recoil speed, to more slowly open lid 104 from the first position to a fully open position. In yet another example, hinge 200 may include hydraulic mechanism that provides an opening force on lid 104 with a gradient opening speed such that, when button 110 is pressed, lid 104 begins to open quickly, but is prevented, by the hydraulic mechanism within hinge 200 from being forced open too quickly either by gas pressure of by a user's effort.

Hinge 200 may also provide a snap-fit locking mechanism that holds lid 104 in the open position shown in FIG. 3 until a force sufficient to disengage the locking mechanism of hinge 200 is provided on lid 104. In this way, lid 104 may be provided with a locked open position that prevents lid 104 from unintentional closing (e.g., while a user is drinking from spout 300).

FIG. 3 also shows how lid 104 may be provided with a latching structure such as a tooth 306 extending from lid 104. Tooth 306 may be configured to extend into an opening in base 302 to engage with a locking and closing/opening mechanism therewithin so that lid 104 is secured in a closed position when tooth 306 is disposed in the opening in base 302 and button 110 is not pressed. The leak and spill proof function is provided with the (e.g., silicone) elastomer 308 in the cap 108 which seals at the top of the spout 300 and on the middle (e.g., bottom) platform within recess 316, where liquid flows through when opened.

FIG. 4 shows a top rear-side perspective view of lid 104. As shown in FIG. 4, tooth 306 may be attached at an inner surface 401 of lid 104. Tooth 306 may be adhesively attached to inner surface 401 or mechanically attached to inner surface 401 in some embodiments. In another embodiment, in order to provide increased strength for lid 104 and cap 108, tooth 306 may be integrally formed with a portion 304 of hinge 200 via an overmolded metal structure within lid 104 as will be discussed in further detail hereinafter.

Hinge member 304 may be rotatably attached to hinge member 400 by, for example, a pin 402. Hinge member 400 may be securely engaged within base 302 of cap 108.

Figure 5:
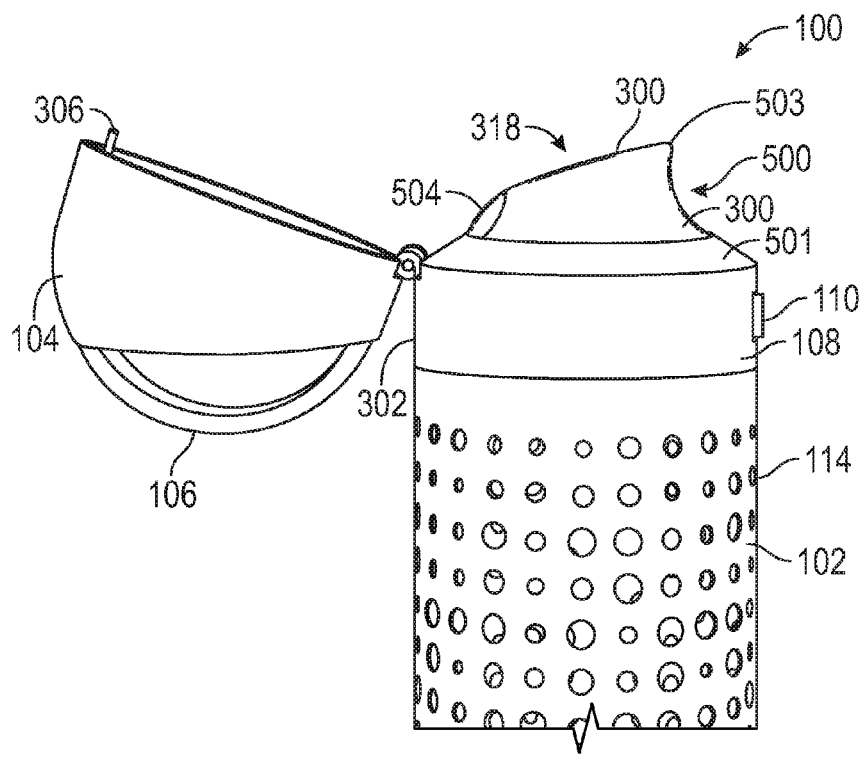
FIG. 5 is a diagram of a side view of an example portable beverage container with an open lid in accordance with some implementations of the subject technology.

FIG. 5 shows a side view of a portion of portable beverage container 100 with an open lid 104. As shown in FIG. 5, removable spout 300 may have a unique slanted shape in which lip 318, in side profile, is angled downwardly toward base 302 in a direction away from a drinking edge 503 of spout 300. A forward surface 500 of spout 300 may have a concave profile configured to provide a comfortable landing platform for the bottom lip of a drinking user. As shown, concave surface 500 may be configured to match the shape of upper surface 501 of base 302 so that a smooth drinking surface is provided with little or no feature on, about, or under which contaminants can remain. In this way, an ergonomic and hygienic drinking spout is provided.

As shown in FIG. 5, spout 300 may include one or more protrusions such as fin 504 at or near the back or side of the spout to provide a grip for a user for easy unlocking and removal of spout 300 from base 302.

Figure 6:
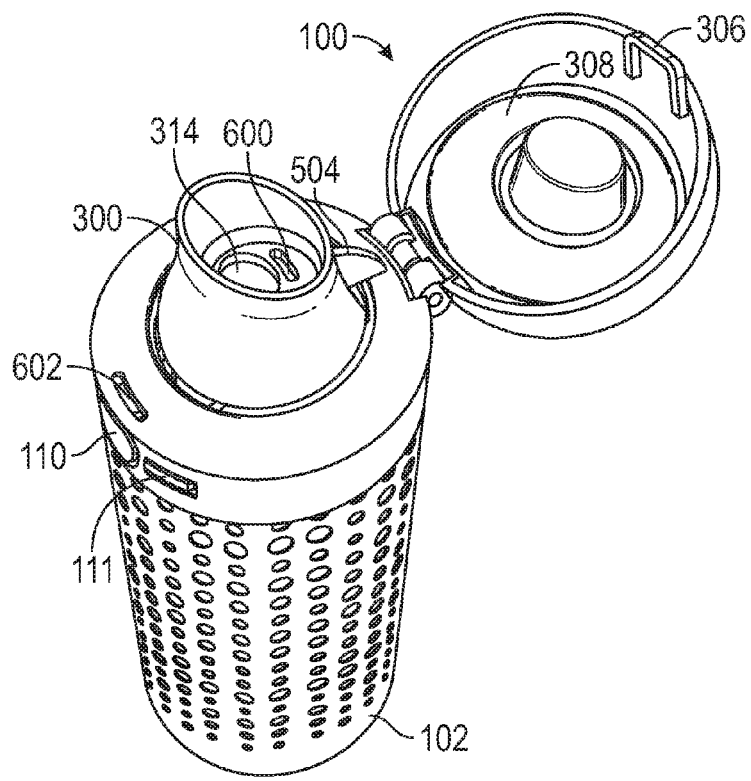
FIG. 6 is a diagram of a top front-side perspective view of an example portable beverage container with an open lid in accordance with some implementations of the subject technology.

FIG. 6 shows a top front-side perspective view of portable beverage container 100 in which an additional opening 600, that may in some implementations be provided in spout 300, is visible. Additional opening 600 may provide a vent hole that allows airflow into inner vessel 101 while liquid flows out of main opening 314. Also visible in the view shown in FIG. 6 is an opening 602 into which tooth 306 of lid 104 is secured when lid 104 is in a closed position. In this way, a latching mechanism (e.g., tooth 306) may be provided on a hinged lid (e.g., lid 104), the latching mechanism configured to be engaged within an opening 602 in base 302 when the hinged lid is in a closed position to secure the hinged lid in the closed position. Button 110 may be operated to disengage the latching mechanism 306 in the opening 602 in the base 302 to allow the hinged lid 104 to move from the closed position (see, e.g., FIGS. 1 and 2) to an open position (see, e.g., FIGS. 3 and 4).

Figure 7:
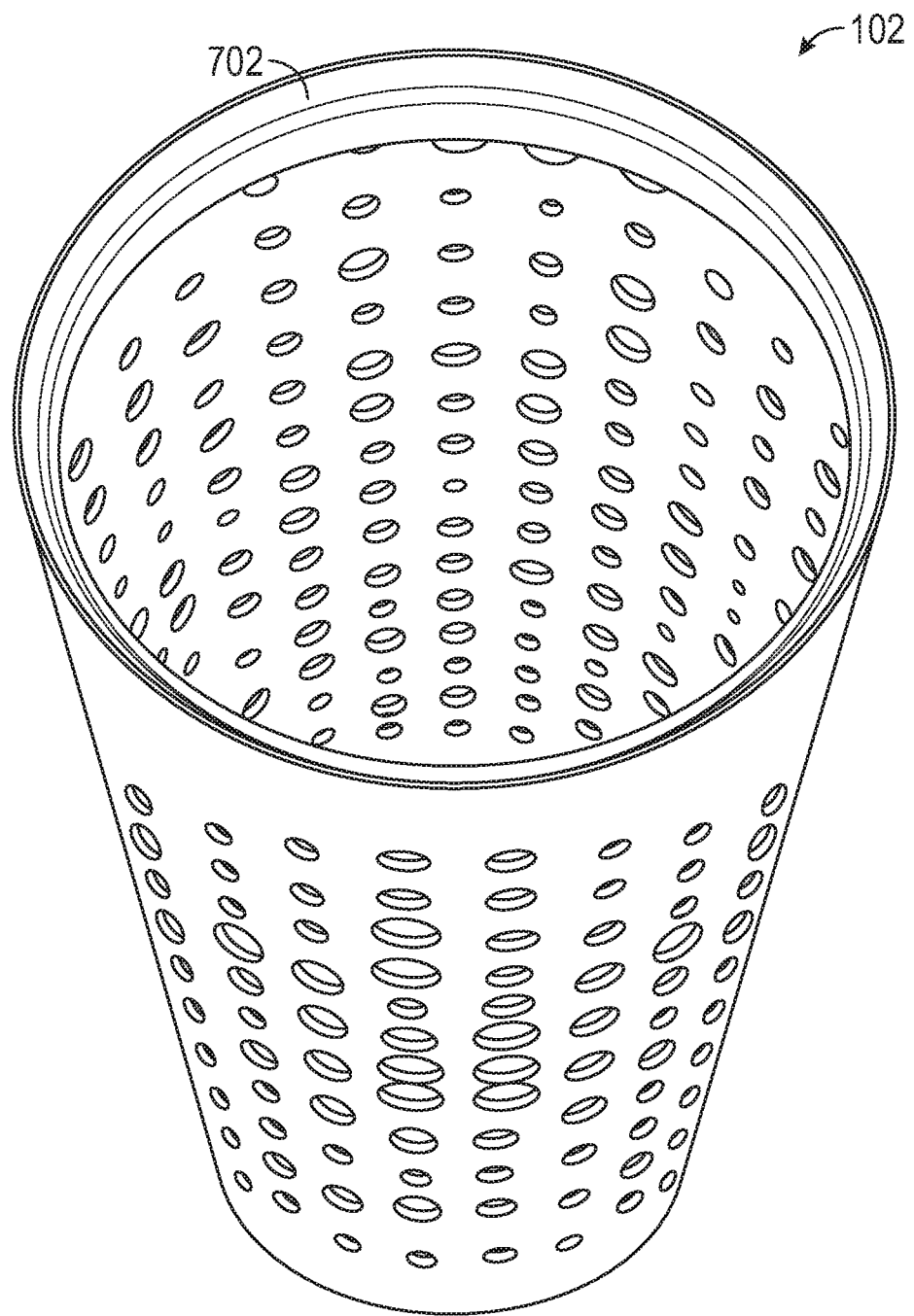
FIG. 7 is a diagram of a perspective view of an example outer shell for a portable beverage container in accordance with some implementations of the subject technology.

FIG. 7 shows outer shell 102 separately from the other components of portable beverage container 100. As shown in FIG. 7, outer shell 102 may include a threaded member 702 disposed at the upper edge of the inner surface thereof. Threaded member 702 may be a separate (e.g., plastic) threaded member that is attached (e.g., adhesively or mechanically attached) to the inner surface of shell 102. However, this is merely illustrative. In other embodiments threaded member 702 may be formed from threads that are integrally machined into the inner surface of shell 102. Cap 108 and outer shell 102 may be attached by engaging corresponding threads on cap 108 with threaded member 702.

FIG. 8 shows a top front perspective view of portable beverage container 100 in which openings 314 and 600 in spout 300 and opening 602 in base 302 are more clearly shown. FIG. 8 also shows an alignment mark 800 on base 302 that indicates the locked position for fin 504 to indicate to a user that spout 300 is securely engaged with cap 108 (e.g., spout 300 is in an engaged position). Alignment mark 800 may be an impression in the material of base 302 or may be a separate alignment mark that is printed on or affixed to base 302. Although fin 504 and alignment mark 800 are shown at the rear of cap 108, this is merely illustrative. In various implementations, one or more fins on spout 300 and corresponding alignment marks on base 302 may be disposed (e.g., at regular angular intervals) around the circumferences of spout 300 and base 302. For example, in one embodiment, fins and corresponding alignment marks may be provided on opposing left and right sides of spout 300 and base 302 to provide two balanced features that facilitate installation and removal of spout 300.

The view of FIG. 8 also shows that the inner surface of lid 104, formed from a combination of the surface of member 308 and interior surface 401, includes only smooth surfaces and relatively large radii curves (e.g., curves associated with knob 310 and recess 312) to facilitate easy, effective cleaning either by wiping or in a dishwasher.

FIG. 9 shows a top front-side perspective view of portable beverage container 100 with lid 104 in an open configuration and spout 300 removed from cap 108. As shown in FIG. 9, spout 300 and inner vessel 101 may be two separate parts. Providing a separate spout and inner vessel in this way may allow for a wider opening at the neck 906 of the inner vessel. A wider neck opening may facilitate easy cleaning of inner vessel 101 and may also facilitate user features such as the ability to insert ice cubes, fruits, or other solid beverage additions into the inner vessel. In one embodiment, spout 300 is removable from cap 108 by, for example, a quarter turn of spout 300.

As shown in FIG. 9, a removable gasket 900 may be disposed around the neck 905 of spout 300. Gasket 900 may be an elastomeric ring formed, for example, from silicone and stretchable for installation on neck 905 of spout 300. In order to attach spout 300 to container 100, neck 905 of spout 300 (with gasket 900 disposed thereon) may be inserted into neck 906 of inner vessel 101. As neck 905 of spout 300 is inserted into neck 906 of inner vessel 101, gasket 900 of spout 300 may be compressed between the neck 905 and neck 906. In this way, gasket 900 may provide a sealed barrier against leakage of liquid from inner vessel 101 to the outer surface of the inner vessel or other interior locations within outer shell 102. In some implementations, spout 300 may be formed from a transparent material that allows a user to see through the spout to gasket 900. In this way, the user may be provided with the ability to verify that gasket 900 is properly installed. In some implementations, gasket 900 may be colored to enhance visibility of the gasket through spout 300.

The compressibility of gasket 900 may provide shock absorption between inner vessel 101 and spout 300. When spout 300 is secured in base 302 of cap 108, neck 905 of spout 300 may provide inner vessel 101, via gasket 900 with additional stabilization and shock absorption.

In some implementations, spout 300 may be an amorphous thermoplastic spout having a neck 905 configured to be inserted through an opening 909 in the cap 108 (e.g., in base 302) and into the neck 906 of the inner vessel 101. Spout 300 may be configured to securely engage with the cap 108. Gasket 900 may be configured to be disposed between the neck 905 of the spout 300 and the neck 906 of the inner vessel 101 to prevent leakage between the neck 905 of the spout and the neck 906 of the inner vessel and to provide shock absorption between the neck 905 of the spout and the neck 906 of the glass vessel. Gasket 900 may be implemented as an elastomeric ring configured to be mounted on an outer surface of the neck 905 of spout 300.

Although FIG. 9 shows gasket 900 formed around a neck 905 of spout 300 that is configured to extend into neck 906 of inner vessel 101, this is merely illustrative. In other implementations, gasket 900 may form a portion of neck 905 of spout 300 such that, when, when gasket 905 (attached to spout 300) is inserted through opening 909 in cap 108, gasket 900 extends downward from spout 300 into contact with an upper lip of inner vessel 101 to form a seal with the upper lip. In these implementations, gasket 900 forms a portion of the flow path of fluid from inner vessel 101 through spout 300 when liquid is poured from container 100. In these implementations, no portion of spout 300 extends into inner vessel 100.

As discussed in further detail hereinafter, an additional shock absorbing member (not visible in FIG. 9) may be disposed within outer shell 102 and compressed between outer shell 102 and inner vessel 101 when inner vessel 101 is inside of outer shell 102 to provide additional stability and shock absorption to inner vessel 101. In this way, inner vessel 101 may be provided with sufficient stability and shock absorption that breakage or other damage may be prevented even in the event of a significant shock (e.g., by dropping of container 100 on a hard surface by the user).

Spout 300 may be formed from the same material as inner vessel 101 or spout 300 and inner vessel 101 may be formed from different materials. In one implementation that is sometimes discussed herein as an example, inner vessel 101 is formed from glass and spout 300 is formed from a polymer such as Grilamid® plastic. In this way, the hygienic properties of a glass vessel may be provided for a user while also enhancing the safety of the drinking interface of container 100. Moreover, because spout 300 is easily separable, without requiring removal of cap 108 from outer shell 102, the hygienic properties of the overall container can be easily maintained (e.g., by replacing and/or washing spout 300).

Providing a spout with a neck 905 that extends into the neck 906 of inner vessel 101 and is sealed by a gasket 900 therebetween may also help prevent liquid from inside vessel 101 from reaching threaded features of cap 108, shell 102, and/or spout 300 by arranging the interface between spout 300 and inner vessel 101 at a location that is spaced apart from (e.g., separated by an air gap) from the threaded features. In this way, further reduction of the potential for trapping, storage, or growth of unwanted substances can be provided.

Spout 300 may include engagement features 904 configured to lockingly engage with corresponding engagement features 902 on the cap 108, while the spout is disposed in the opening 909 of the cap. The engagement features 904 of the spout 300 may include a locking engagement feature that locks the spout 300 in an engaged position in the opening. External fin 504 of spout 300 (see, e.g., FIG. 5) may be configured to provide a grip for a user to disengage the locking engagement feature of the spout for removal of the spout by turning (e.g., by a quarter turn) of the spout.

As noted above in connection with FIG. 3, in some implementations, tooth 306 and hinge member 304 may be formed as portions of a common insert molded structure within lid 104. FIGS. 10-12 show various views of lid 104 in an implementation in which tooth 306 and hinge member 304 are formed as portions of a common insert molded structure within lid 104.

FIG. 10 shows an assembled side perspective view of portable beverage container 100 with lid 104 in an open position and showing hinge member 304 and tooth 306 protruding from within cap 108. In the example of FIG. 11, an outer layer of lid 104 is not shown so that an inner cap ring 1100 can be seen. As shown in FIG. 11, inner cap ring 1100 may include integrally formed features that include tooth 306 and hinge member 304. For example, inner cap ring 1100 may be a continuous, substantially cylindrical ring that runs round the lower edge of lid 104 and which includes hinge member 304 and tooth 306 integrally formed thereon on opposing sides. In this way, a stronger latching mechanism, a strong hinge structure, and enhanced overall stability and strength may be provided for lid 104. In this way, tooth 306 and hinge member 304 may be mounted to lid 104 in an aesthetically pleasing manner in which tooth 306 and hinge member 304 appear to "float" at respective locations within lid 104. Inner cap ring 1100 may be formed from rigid material such as metal (e.g., aluminum or steel) to form a rigid cap ring. A plastic or other polymer material 1000 may be overmolded onto inner cap ring 1100 to form lid 104.

A perspective view of a molded lid member 1200 is shown in FIG. 12 in partial transparency so that inner cap ring 1100 can be seen therewithin. In the perspective view of FIG. 12, surface features of lid member 1200 can be seen. For example, a top surface 1201 of lid member 1200 may include openings 1202 and 1204. Openings 1202 may be configured to receive corresponding engagement features on elastomeric sealing member 308. Opening 1204 may be configured to receive a corresponding engagement member of an additional lid member.

Figure 13:
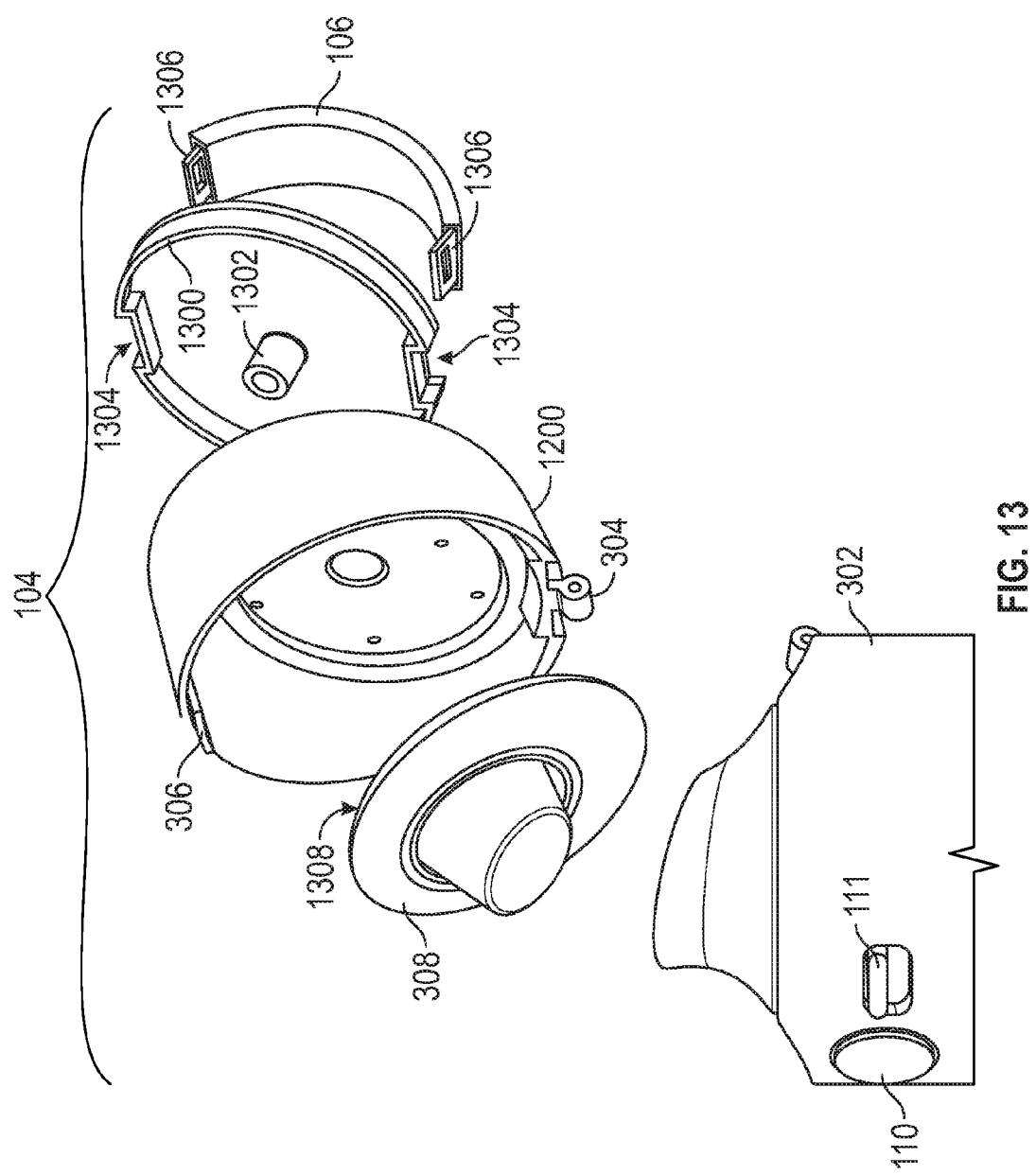
FIG. 13 is a diagram of a front-side exploded perspective view of an example lid for a portable beverage container in accordance with some implementations of the subject technology.

In particular, as shown in the exploded front-side perspective view of lid 104 in FIG. 13, lid 104 may include an additional lid member 1300 having a protrusion 1302 and one or more notches 1304. Protrusion 1302 may be a cylindrical protrusion configured to extend into opening 1204 of lid member 1200 upon assembly of lid 104. Notches 1304 may be configured to receive engagement members 1306 of handle 106 upon assembly of lid 104. When lid member 1300 is engaged with lid member 1200, engagement members 1306 may be secured between lid member 1300 and lid member 1200 within notches 1304. Protrusions 1308 of elastomeric member 308 may be configured to extend into openings 1202 to help secure elastomeric member 308 to lid member 1200.

Figure 14:
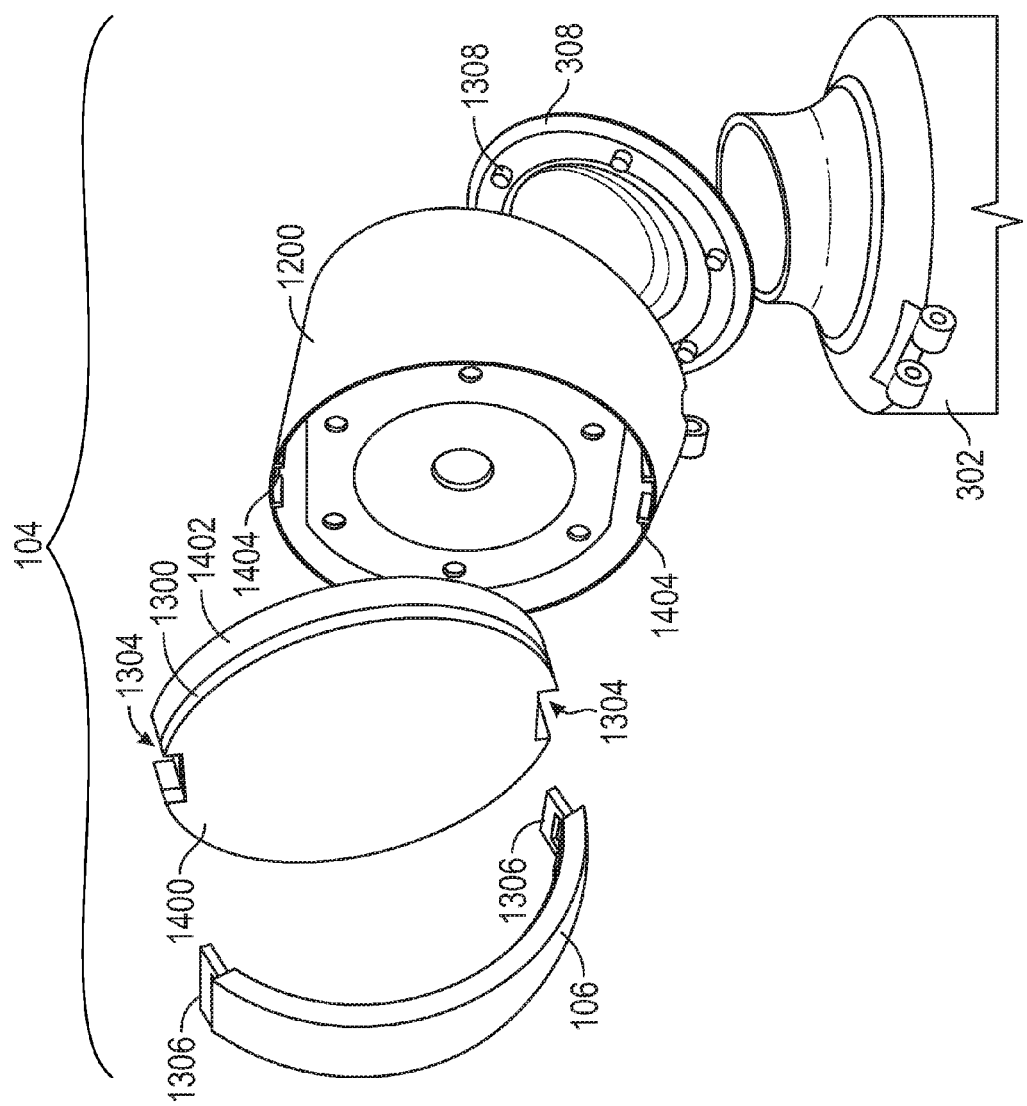
FIG. 14 is a diagram of a rear-side exploded perspective view of an example lid for a portable beverage container in accordance with some implementations of the subject technology.

FIG. 14 shows a rear-side exploded perspective view of lid 104 in which protrusions 1308 of elastomeric sealing member 308 can be more easily seen. As shown in FIG. 14, lid member 1200 may also include interior protrusions 1404 that help position and secure engagement members 1306 between lid member 1200 and lid member 1300 within notches 1304. Lid member 1300 may be formed from a rigid structure 1402 and a relatively softer material 1400 that provides a softer outer surface with which a user may contact during use. For example, material 1400 may be an elastomeric material such as a thermoplastic elastomer (TPE) material that is overmolded onto a rigid plastic member 1402.

The various components of lid 104 shown and described in connection with FIGS. 13 and 14 can be secured together (e.g., using adhesives, mechanical couplings such as press-fit or snap-fit couplings, and/or fusion coupling via welding such as ultrasonic welding) to form a lid structure 104 that is configured to be attached to base 302 at hinge 200.

Figure 15:
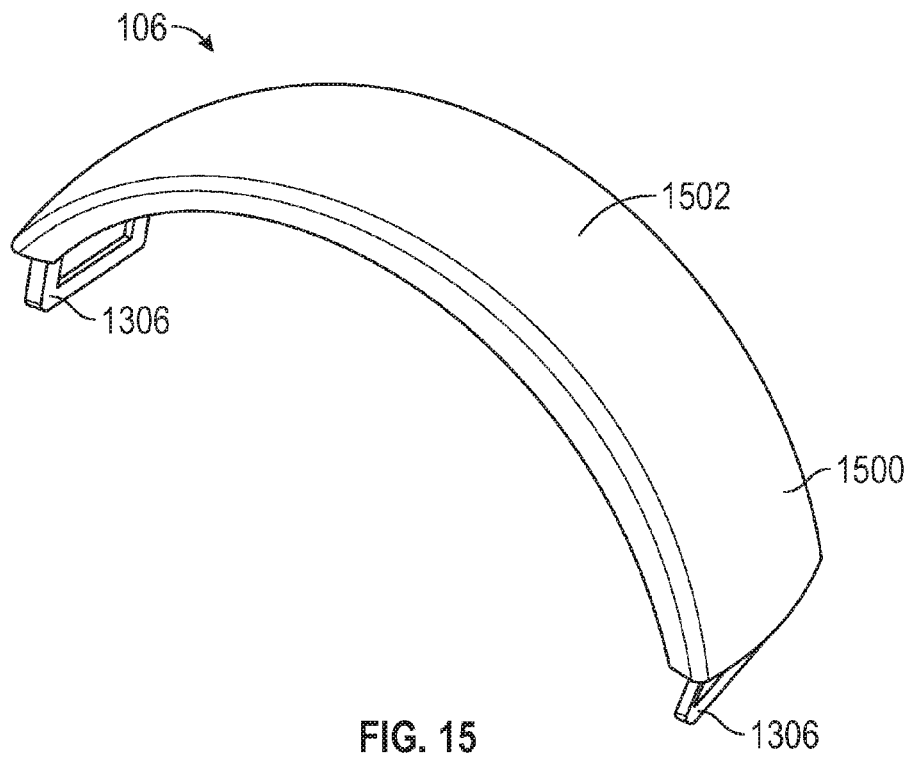
FIG. 15 is a diagram of a perspective view of an example handle for a portable beverage container in accordance with some implementations of the subject technology.

FIG. 15 shows a perspective view of handle 106 in which an elastomeric outer material 1500 of handle 106 is shown in partial transparency to show that handle 106 may include an inner rigid member 1502. For example, rigid member 1502 may be a metal (e.g., aluminum or steel) handle that is overmolded with elastomer such as a thermoplastic elastomer (TPE) material. In this way, a rigid, strong handle can be provided with a comfortable user grip. As shown, engagement member 1306 may be end portions of an arced inner rigid member 1502 that extend beyond the edges of the overmolded elastomer 1500.

Figure 16:
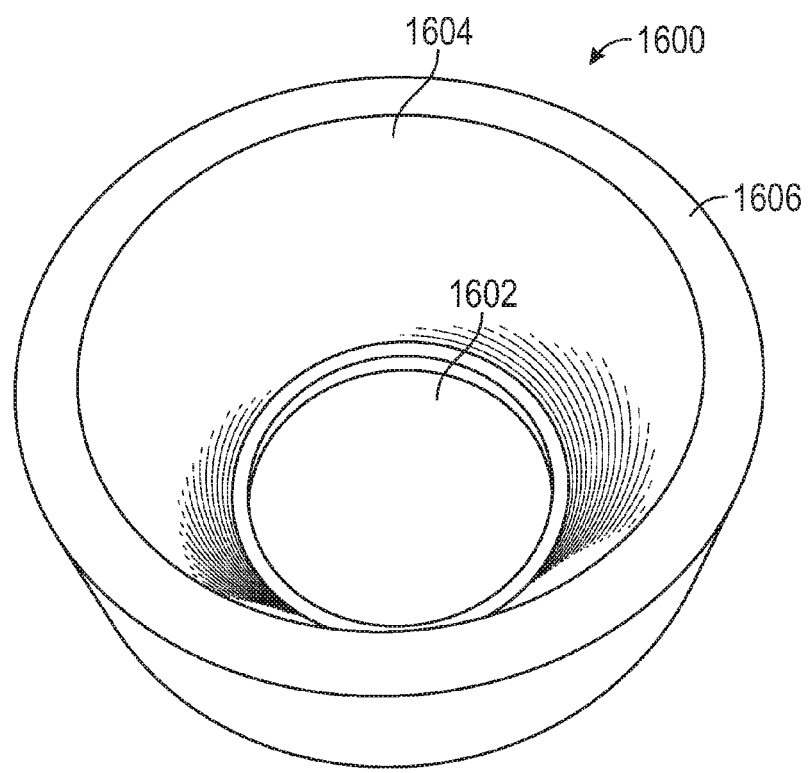
FIG. 16 is a diagram of a perspective view of an example bottom shock absorber for a portable beverage container in accordance with some implementations of the subject technology.
Figure 17:
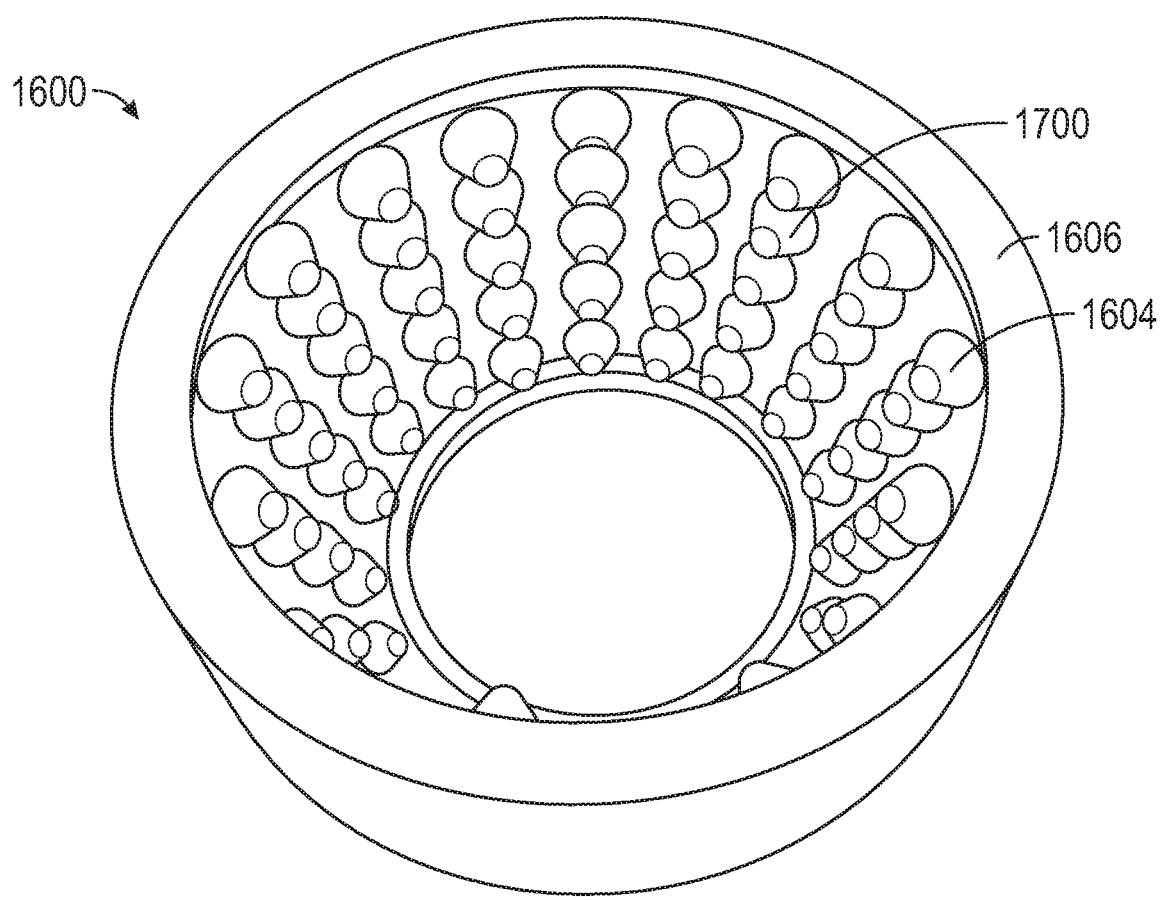
FIG. 17 is a diagram of a perspective view of an example patterned bottom shock absorber for a portable beverage container in accordance with some implementations of the subject technology.
Figure 18:
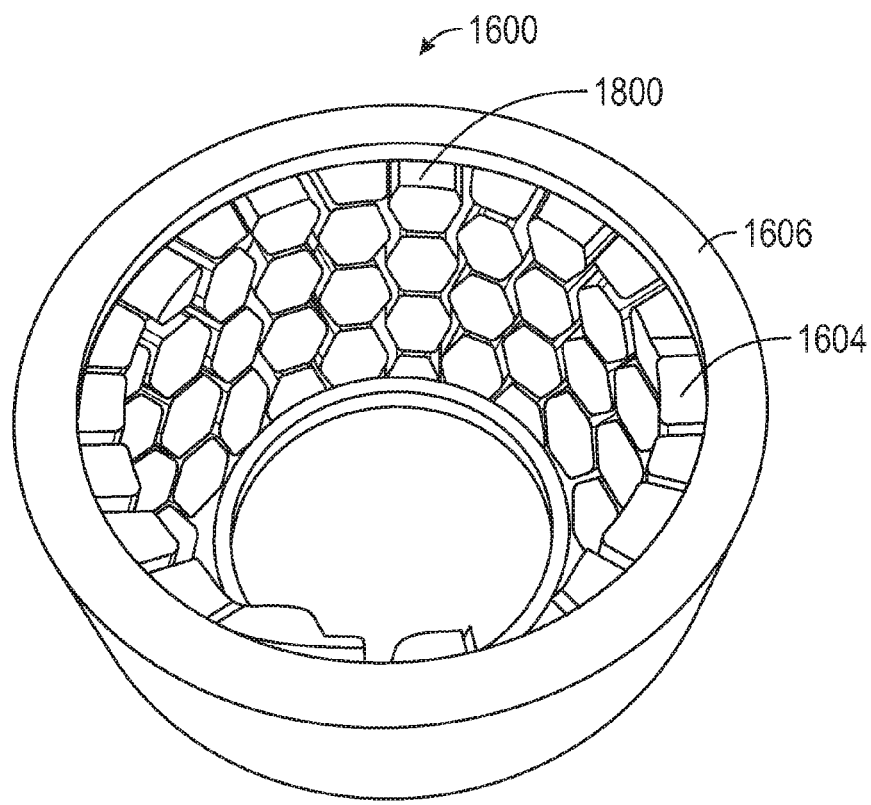
FIG. 18 is a diagram of a perspective view of another example patterned bottom shock absorber for a portable beverage container in accordance with some implementations of the subject technology.
Figure 19:
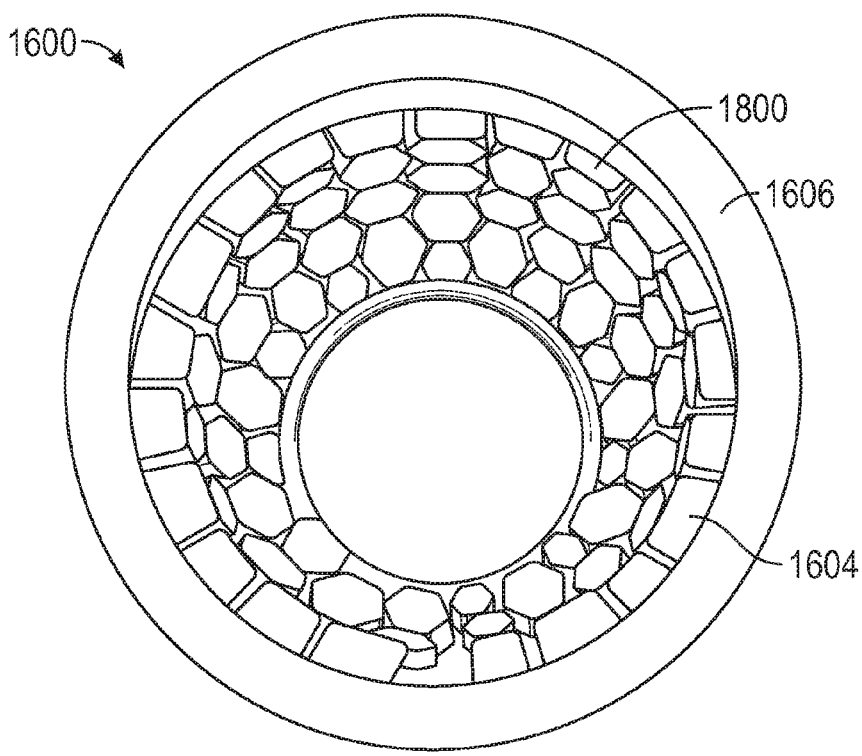
FIG. 19 is a diagram of a face-on view of another example patterned bottom shock absorber for a portable beverage container in accordance with some implementations of the subject technology.

As noted above, in various implementations, container 100 may be provided with shock absorbing structures for inner vessel 101. The shock absorbing structures may include bottom shock absorbing structures, various implementations of which are shown in FIGS. 16-19. In particular, FIG. 16 shows a perspective view of an example bottom shock absorber 1600 that may be engaged within outer shell 102 at a bottom end and configured to receive and support a corresponding bottom end of inner vessel 101. In the example of FIG. 16, bottom shock absorber 1600 is formed from a foam 1604 (e.g., a Poron® foam) disposed within a cup structure 1606. Cup structure 1606 and foam 1604 may be formed with an opening 1602. Cup structure 1606 may be rigid or flexible and may be formed from plastic or other more flexible materials such as silicone. In the example of FIG. 16, foam 1604 has a smooth top surface. However, this is merely illustrative. As shown in FIG. 17, foam 1604 may be provided with protruding structures such as pyramidal protrusions 1700 that further enhance the shock absorbing properties of the foam. As shown in FIGS. 18 and 19, polygonal protrusions 1800 having a flat top surface may be provided instead of pyramidal protrusions 1700. However, the protrusions of FIGS. 17-19 are merely illustrative and other suitable shock absorbing features, structures, shapes, or location-based stiffness of foam 1604 may be used as desired.

Figure 20:
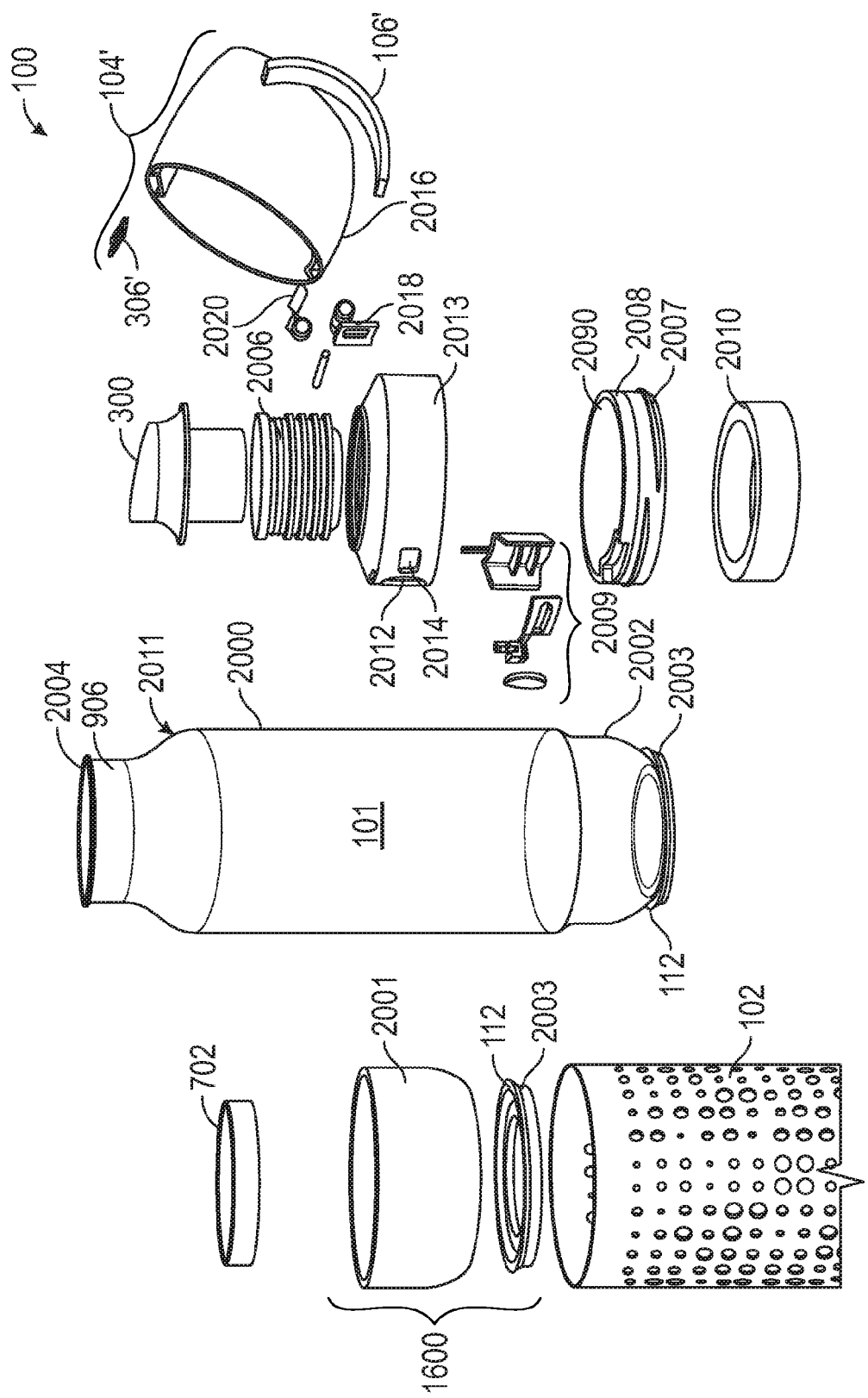
FIG. 20 is a diagram of an exploded perspective view of an example portable beverage container in accordance with some implementations of the subject technology.

FIG. 20 shows an exploded perspective view of an example implementation of portable beverage container 100. Various features of cap 108 and lid 104 of FIG. 20 are different from those described above in connection with FIGS. 1-19. It should be appreciated that, in various implementations, any of the features of the implementation shown in FIG. 20 can be combined with any of the features described above in connection with FIGS. 1-19 without departing from the spirit of the present disclosure.

FIG. 20 shows an exemplary implementation of inner vessel 101. As shown in FIG. 20, inner vessel may be a transparent (e.g., glass) vessel having a cylindrical central portion 2000, a neck 906, a lip 2004, a shoulder 2011 disposed between the cylindrical portion 2000 and neck 906, and a recessed bottom portion 2002 (sometimes referred to as a base).

A bottom portion of inner vessel 101 such as recessed bottom portion 2002 may be shaped and configured to seat within shock absorber 1600 (e.g., within the shock-absorbing cup). In the example of FIG. 20, shock absorber 1600 is formed from a shock-absorbing cup 2001 (e.g., a silicone cup or a hybrid silicone and foam cup as described herein) and foot 112 described above in connection with FIG. 1. Upon assembly of container 100, cup 2001 may be attached (e.g., adhesively) to foot 112 and a structure formed from the attached foot 112 and cup 2001 may be inserted into outer shell 102 from the top side and moved through the cylindrical shell to the bottom side thereof. As shown, foot 112 may include a recess 2003 configured to engage a bottom edge of shell 102. Foot 112 may be mechanically secured to shell 102 or may be adhesively sealed to shell 102.

In the example of FIG. 20, threaded member 702 is formed from a separate member (e.g., a plastic member) that, upon assembly, is adhesively attached to the interior surface of outer shell 102 to provide engagement structures (e.g., threads) for corresponding engagement structures (e.g., threads) on cap 108.

FIG. 20 also shows an additional shock absorption member 2010, which may be permanently or removably disposed within cap 108 to provide top-side or upper shock absorption for inner vessel 101. For example, additional shock absorption member 2010 may be attached to an inner wall of cap 108 such that, when cap 108 is screwed onto outer shell 102 while inner vessel 101 is disposed within the outer shell 102, additional shock absorption member 2010 surrounds and contacts neck 906 and/or shoulder 2011 of inner vessel 101. In one implementation, additional shock absorption member 2010 may be a silicone and/or foam ring that is adhesively attached to interior surface 2090 of thread member 2008. In another implementation, additional shock absorption member 2010 may be a silicone and/or foam ring that snap-fits into place within interior surface 2090 of thread member 2008. For example, inner surface 2090 may include a recess or a protrusion that engages with a corresponding protrusion or recess of shock absorption member 2010 to secure shock absorption member 2010 to inner surface 2090 of threaded ring 2008.

When cap 108 is screwed onto outer shell 102, additional shock absorption member 2010 may be compressed onto the shoulder 2011 of inner vessel 101 to secure inner vessel 101 in place within outer shell 102. In another example, a further additional shock absorption member such as a silicone ring or bump may be adhesively attached to the inner surface of outer shell 102 at a location below threaded member 702 and just above the location at which shoulder 2011 of inner vessel 101 seats when recessed portion 2002 of inner vessel 101 is seated in cup 2001.

Additional shock absorption member 2010 may be a cylindrical shock-absorbing ring having an inner radius that is smaller than the outer radius of inner vessel 101 at shoulder 2011. In this way, additional shock absorption member 2010 may be sized and positioned such that, when inner vessel 101 is fully inserted into outer shell 102 and cap 108 is secured to outer shell 102, shock absorber 2010 bears downwardly and inwardly on shoulder 2011 to both secure inner vessel 101 in place and absorb any external shock to outer shell 102 or cap 108 to prevent damage to inner vessel 101.

The bottom of a glass implementation of inner vessel 101 may be protected from impact or damage by cup 2001, positioned between the glass and the bottom of outer shell 102. The shock absorption cup 2001 may be co-molded to the bottom ring 112, which may also prevent the container 100 from skidding as described herein, in some embodiments. Accordingly, in this implementation, shock absorption cup 2001 at the bottom, and a silicone ring 2010 just below the (e.g., plastic) thread 702 at the top of the aluminum sleeve 102, may keep a glass bottle 101 in a resiliently locked position.

The implementation of inner vessel 101, outer shell 102, shock absorbers 1600 and 2010 and thread member 702 of FIG. 20 may be used, in various embodiments, with a cap 108 having some or all of the features described above in connection with FIGS. 1-19. However, this is merely illustrative. In other embodiments, the implementation of inner vessel 101, outer shell 102, shock absorbers 1600 and 2010 and thread member 702 may be used with other embodiments of cap 108 such as the embodiment shown in FIGS. 20 and 21.

As shown in FIG. 20, in one implementation, a lid 104' may be provided for container 100 that includes a handle 106', lid member 2016, a hinge member 2020 and a latch member 306' in which latch member 306' is configured to be secured within a recess in lid member 2016. Hinge member 2020 may be configured to be secured within an additional recess in lid member 2016 that is located in opposition to the opening for latch member 306'

In the example of FIG. 20, spout 300 is provided with an extended gasket member 2006 having a plurality of cylindrical protrusions that may help provide additional sealing and shock absorption between the neck of spout 300 and neck 906 of inner vessel 101 in an assembled configuration. In the implementation shown in FIG. 20, the base of cap 108 may be formed from a first base member 2013 (e.g., a rigid plastic member) having openings 2012 and 2014, a hinge member 2018 configured to rotatably couple to hinge member 2020 of lid 104', an opening and locking assembly 2009, and a second base member 2008 (e.g., a rigid plastic member such as a threaded ring) having threads 2007 configured to engage with thread member 702 to secure the cap to outer shell 102.

Figure 21:
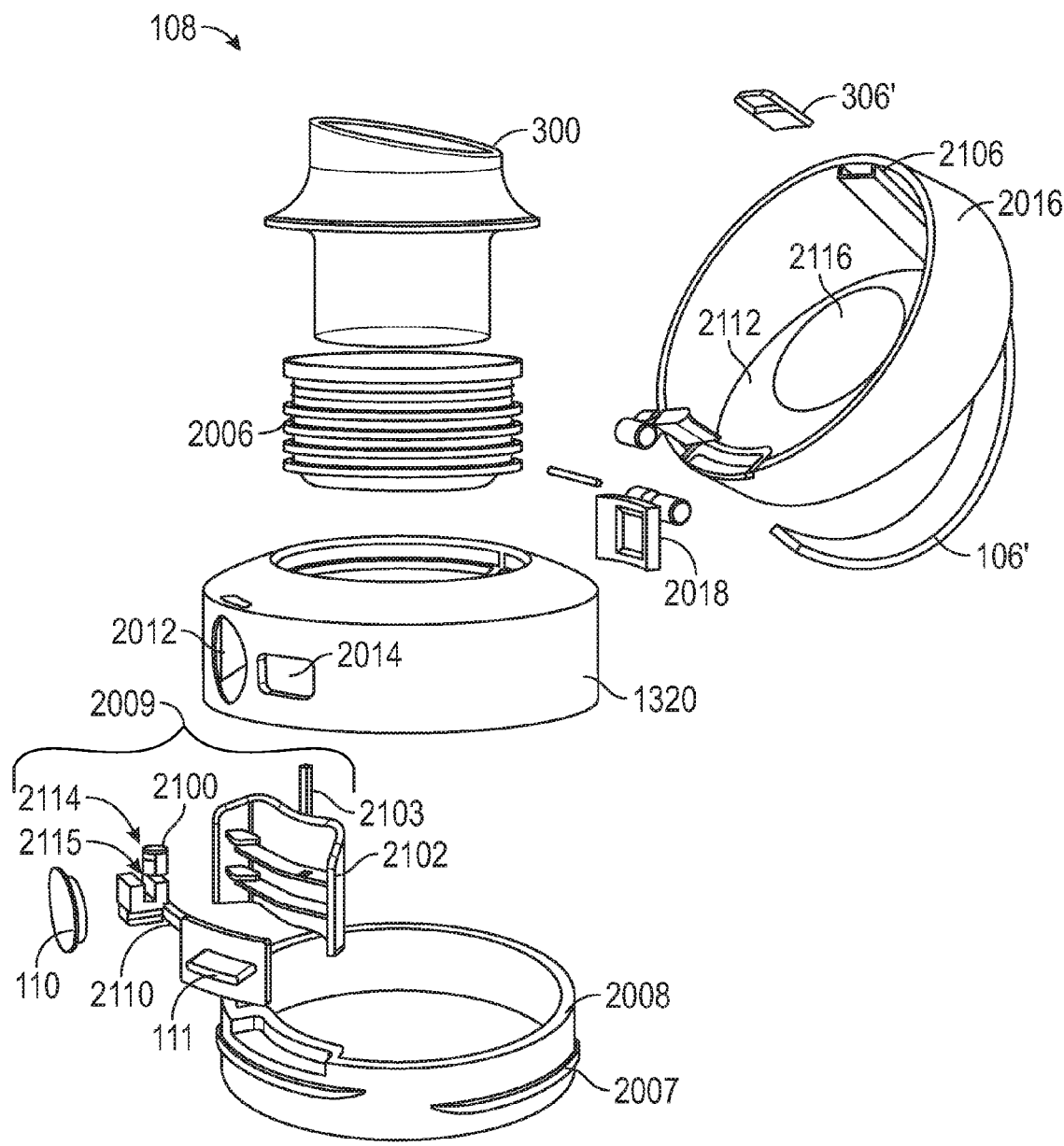
FIG. 21 is a diagram of an exploded perspective view of an example cap for a portable beverage container in accordance with some implementations of the subject technology.

Further details of opening and locking assembly 2009 are shown in the exploded perspective view of cap 108 shown in FIG. 21 in accordance with some implementations.

As shown in FIG. 21, opening and locking assembly 2009 may include button member 110, switch member 111, interface structure 2100 (e.g., a molded plastic interface structure), interior fixture 2101 (e.g., a molded plastic fixture with rigid mating structures such as metal mating structures), and pin 2103. In an assembled configuration for opening and locking assembly 2009, compression of button 110 may cause interface structure 2100 to move such that a latching feature 2114 disengages from latching features 306' (or 306) to release lid 104' (or 104) for opening. However, as shown in FIG. 21, switch 111 may include a lateral protrusion 2110 that extends from the switch in the direction of button 110 within cap 108 such that, when switch is in a first (e.g., locked) position, protrusion 2110 is disposed within a recess 2115 of interface structure 2100, thereby preventing actuation of interface structure 2100 and button 110 and preventing opening of lid 104' (or 104).

Moving switch 111 from the first (e.g., locked) position to a second (e.g., unlocked) position (e.g., by sliding switch 111 up or down along pin 2103) may slide protrusion 2110 out of recess 2115 thereby allowing actuation of interface structure 2100 by compression of button 110. In an assembled configuration, button 110 may be disposed within and protrude from opening 2012. In the assembled configuration, switch 111 may be disposed within and protrude from opening 2014. Interface structure 2100 may be resiliently mounted (e.g., by spring loading) between button 110 and structure 2102 with a resting position that is biased outward from cap 108.

In the example of FIG. 21, lid 104' is provided with an elastomeric sealing member 2112 with a recess 2116 that does not include a knob as discussed above in connection with, for example, FIG. 3. However, this is merely illustrative. In various implementations, the lid for container 100 may be provided with or without a knob.

Figure 22:
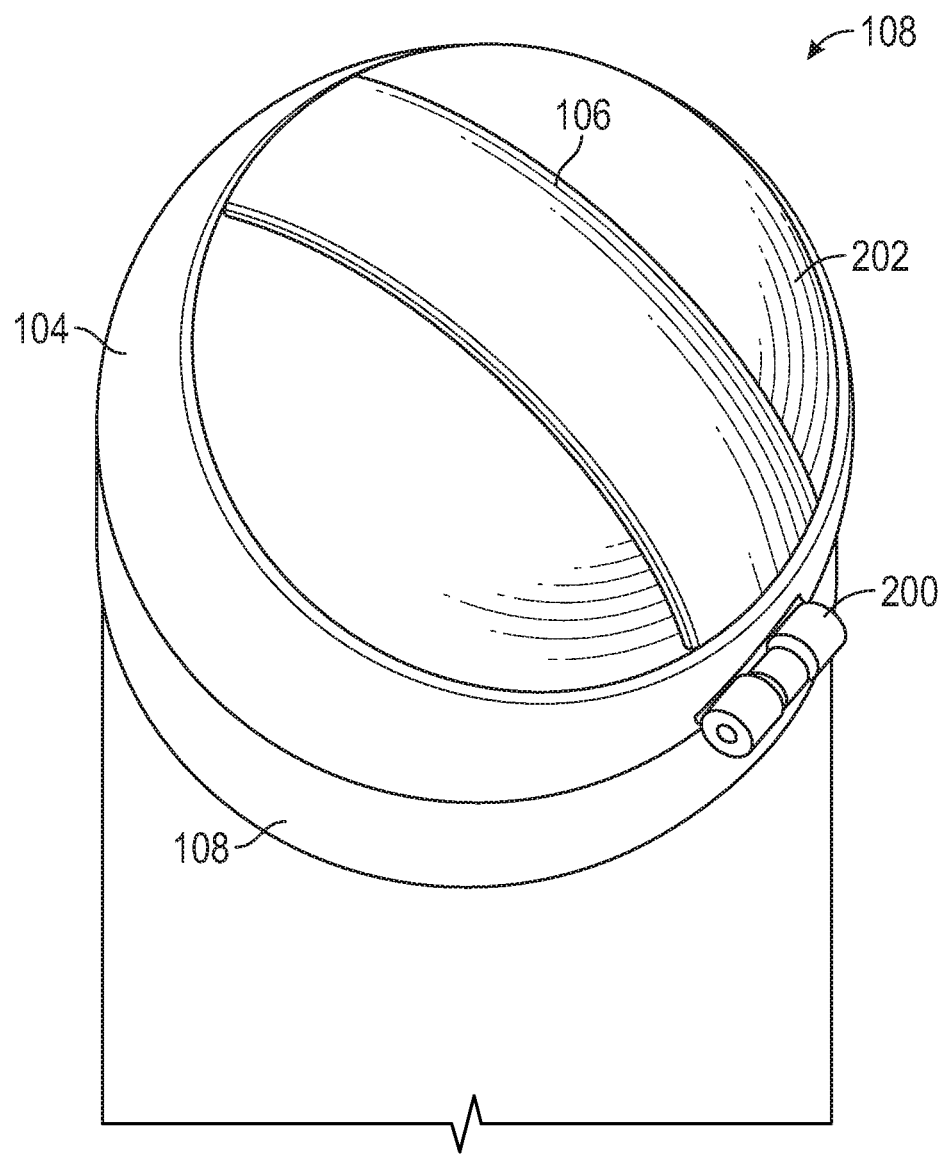
FIG. 22 is a diagram of a top rear perspective view of an example cap for a portable beverage container in accordance with some implementations of the subject technology.

FIG. 22 shows a top rear perspective view of portable beverage container 100 in which it can be seen that handle 106 has an arc shape that is matched to the arc shape of lid 104 such that a domed overall shape for cap 108 is provided in which the aligned handle 106 perfects or completes the domed shape.

Figure 23:
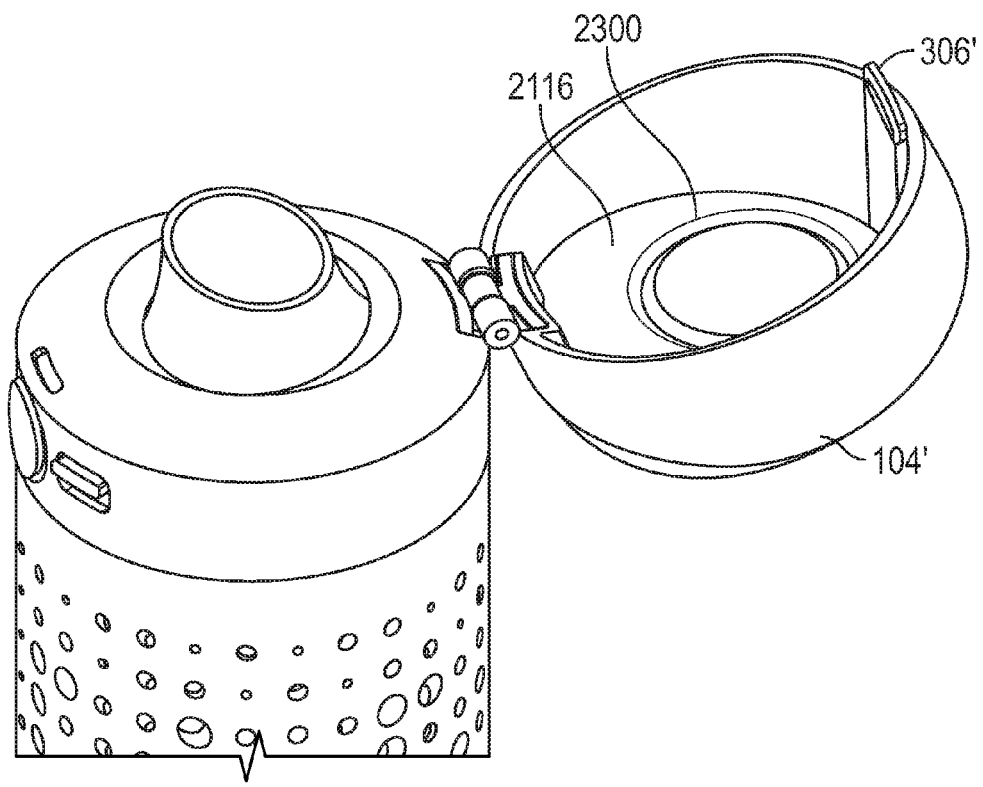
FIG. 23 is a diagram of a top side perspective view of an example portable beverage container with an open lid in accordance with some implementations of the subject technology.

FIG. 23 shows a top side perspective view of a portion of portable beverage container 100 in an assembled configuration in which the lid is implemented as in the examples of FIGS. 20 and 21.

Figure 24:
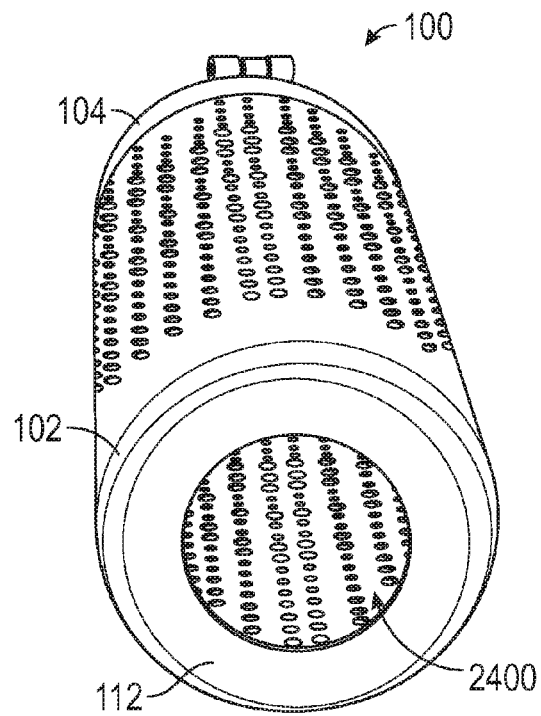
FIG. 24 is a diagram of a bottom perspective view of an example portable beverage container in accordance with some implementations of the subject technology.

FIG. 24 shows a bottom perspective view of portable beverage container 100 in accordance with some implementations. As shown in FIG. 24, foot 112 may be engaged with a bottom edge of outer shell 102. Outer shell 102 and foot 112 may include co-aligned openings that form a bottom opening 2400 for container 100 that allows a view into inner vessel 101 from the bottom.

Figure 25:
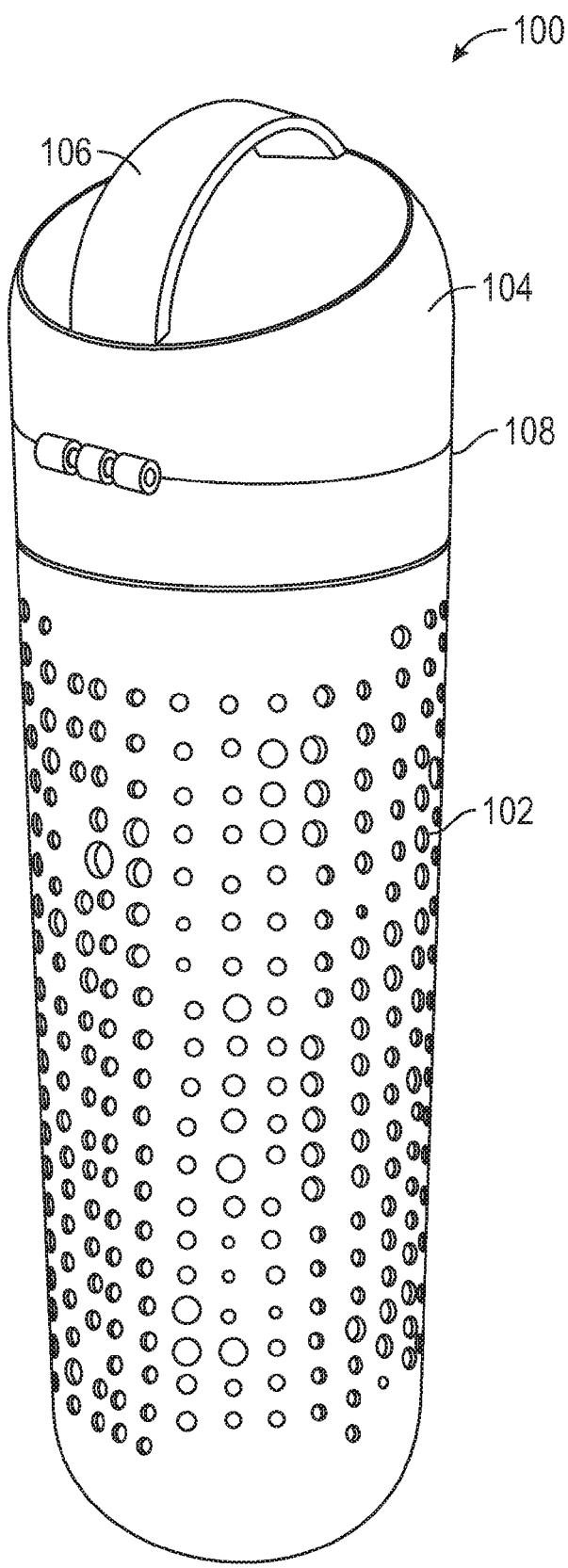
FIG. 25 is a diagram of a top rear perspective view of an example portable beverage container in accordance with some implementations of the subject technology.

FIG. 25 shows a top rear perspective view portable beverage container in which it can be seen that the handle 106 may have an arc shape that is matched to the arc shape of lid 104 such that a domed overall shape cap is provided in which the aligned handle 106 perfects or completes the domed shape.

Figure 28:
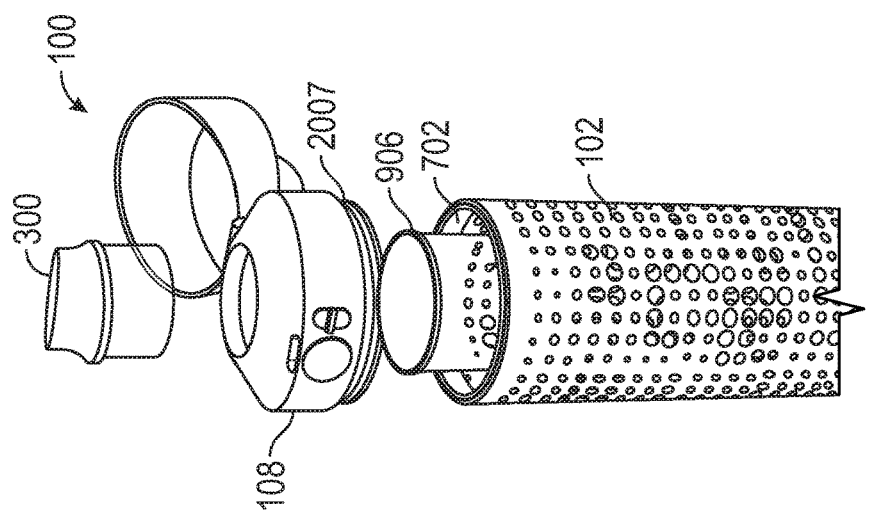
FIG. 28 is a diagram of a top front perspective view of an example portable beverage container and removed cap in accordance with some implementations of the subject technology.
Figure 27:
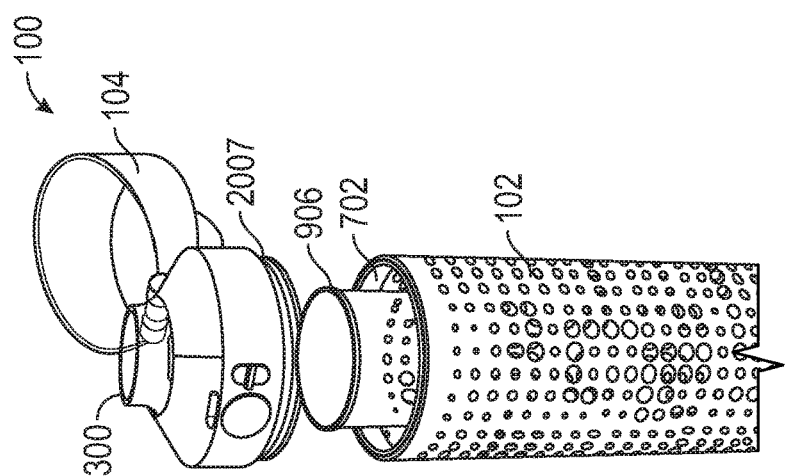
FIG. 27 is a diagram of a top front perspective view of an example portable beverage container and removed cap and an open lid in accordance with some implementations of the subject technology.
Figure 26:
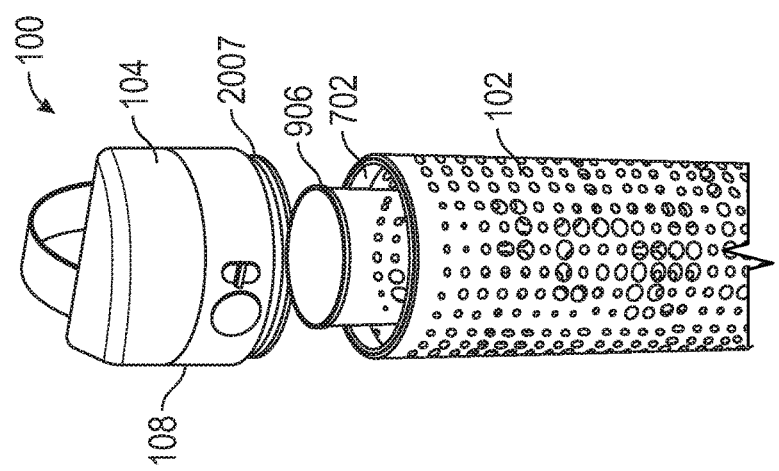
FIG. 26 is a diagram of a top front perspective view of an example portable beverage container and removed cap in accordance with some implementations of the subject technology.

FIGS. 26, 27, and 28 show a top front perspective view of portable beverage container 100 in various states of assembly in accordance with some implementations. In particular, FIG. 26 shows portable beverage container 100 with inner vessel 101 disposed within outer shell 102 such that neck 906 protrudes from a top edge of outer shell 102. In this arrangement, inner vessel 101 may be secured within outer shell 102 by opposing forces from an upper shock absorber 2010 and a lower shock-absorbing cup 1600. In the example of FIG. 26, cap 108 has been unscrewed from outer shell 102 (e.g., by rotating cap 108 to unscrew and disengage threads 2007 from threaded member 702) and lifted to remove the neck of the spout (not visible in FIG. 26) from neck 906.

In the example of FIG. 27, lid 104 is in an open position so that spout 300, which has been removed from neck 906 of inner vessel 101 can be seen.

In the arrangement shown in FIG. 28, spout 300 has been removed from cap 108. The example of FIG. 28 illustrates how spout 300 can be removed from cap 108 from the top side of the cap (e.g., the side opposite the side that engages with outer shell 102). In this way, a removable spout is provided that can be easily disengaged (e.g., for replacement and/or cleaning and/or for filling or emptying of vessel 101) without removing cap 108 (e.g., while cap 108 is secured to outer shell 102).

Figure 29:
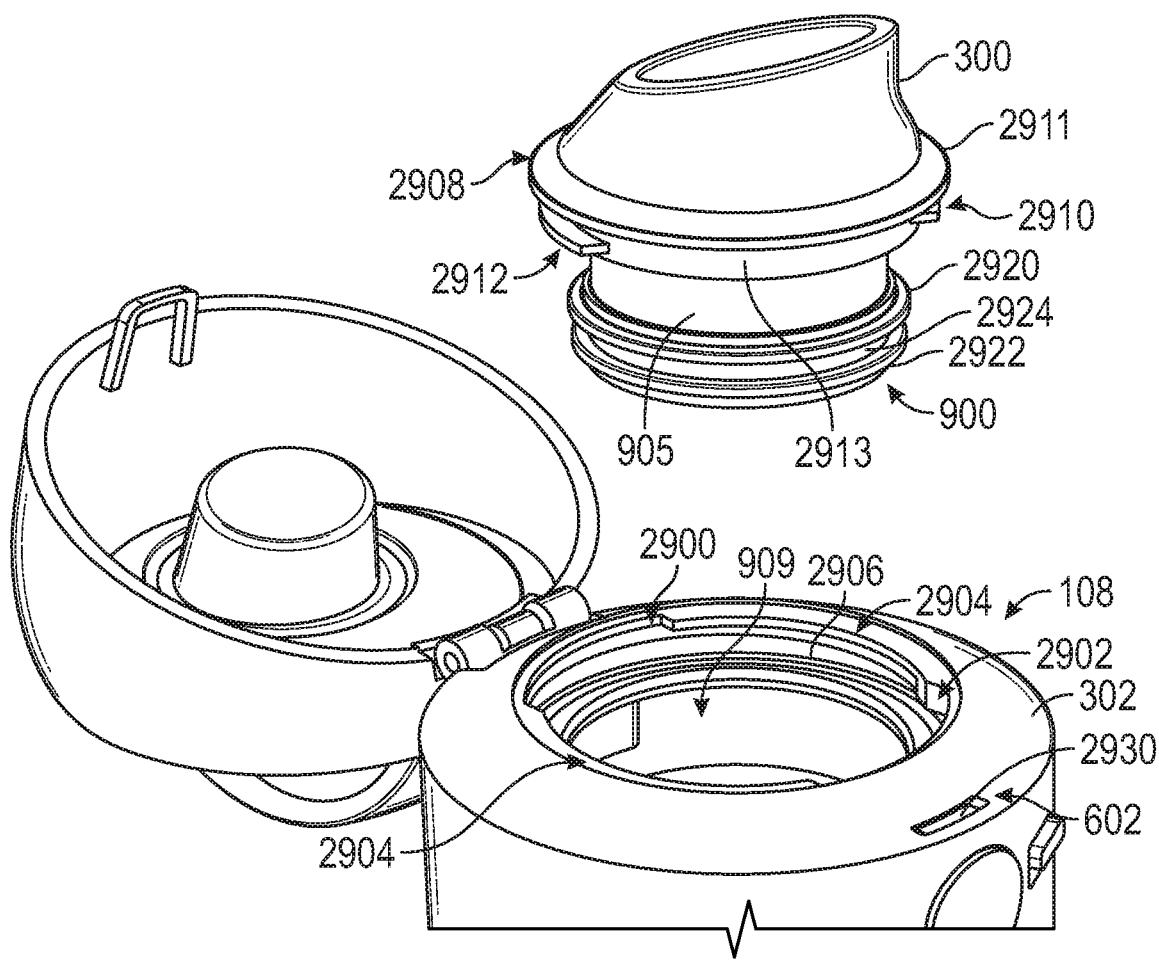
FIG. 29 is a diagram of an enlarged view of the top front-side perspective view of the example portable beverage container of FIG. 9 in accordance with some implementations of the subject technology.

FIG. 29 shows an enlarged view of the implementation of portable beverage container 100 of FIG. 9 in which spout 300 has been removed from the top side of base 302 of cap 108. In the enlarged view of FIG. 29, engagement features by which spout 300 can be secured to cap 108 can be seen. For example, base 302 of cap 108 may include engagement features in opening 909 such as a front cutout 2902, a rear cutout 2900, upper ridges 2904 that each run along the interior edge of opening 909 between front cutout 2902 and rear cutout 2900, and lower ridge structures 2906.

Front recess 2902 may be configured to receive a correspondingly-shaped edge protrusion 2910 on circumferential edge 2911 of spout 300 when spout 300 is engaged with base 302 such that a smooth, continuous surface is generated at the interface between base 302 and spout 300 at the front of base 302. Rear recess 2904 may be configured to receive a correspondingly-shaped edge protrusion 2908 on circumferential edge 2911 of spout 300 when spout 300 is engaged with base 302 such that a smooth, continuous surface is generated at the interface between base 302 and spout 300 at the rear of base 302.

Spout 300 may also include, in some implementations, a lower circumferential structure 2913 configured to bear against upper ridges 2904 and/or lower ridge structure 2906 while spout 300 is rotated within opening 909 to guide spout 300 into an engaged or locked position. Lower circumferential structure 2913 may include features such as protrusion 2912 that help ensure the correct orientation of spout 300 when neck 905 of spout 300 is inserted into opening 909. In some implementations, locking engagement features of spout 300 such as feature 2912 may interact with corresponding features on upper ridges 2904, lower ridge structure 2906 and/or other locking engagement features such as bumps or bars thereon to provide a snap-fit engagement for spout 300 within opening 909 when spout 300 is rotated into the engaged position.

For example, feature 2912 may have a circumferential shape that corresponds to the shape of rear cutout 2904 so that neck 905 can only be extended through opening 909 if feature 2912 and cutout 2900 are aligned. Accordingly, feature 2912 may have a shape that is substantially similar to the shape of edge protrusion 2908. Feature 2912 may be rotationally offset with respect to edge protrusion 2908 by a desired angle so that a corresponding predetermined rotation of spout 300 (e.g., a quarter or 90 degree turn) of spout 300 can be performed to engage or disengage spout 300 from base 302.

FIG. 29 also shows an enlarged view of opening 602 and of gasket 900. As shown, an internal latching structure 2930 may be disposed within opening 602 and configured to capture a latching feature such as latching features 306 or 306' of lid 104 described above in connection with, for example, FIGS. 3 and 21. Internal latching structure 2930 may be operatively coupled to button member 110 such that pressing button 110 moves internal latching structure 2930 to disengage from the latching feature of lid 104 to allow opening of lid 104. Internal latching structure 2930 may, for example, be an implementation of interface structure 2100 of FIG. 21. As shown in FIG. 29, in some implementations, gasket 900 may include two compressible circumferential ridges 2920 and 2922 disposed on opposing sides of a circumferential recess 2924.

Figure 30:
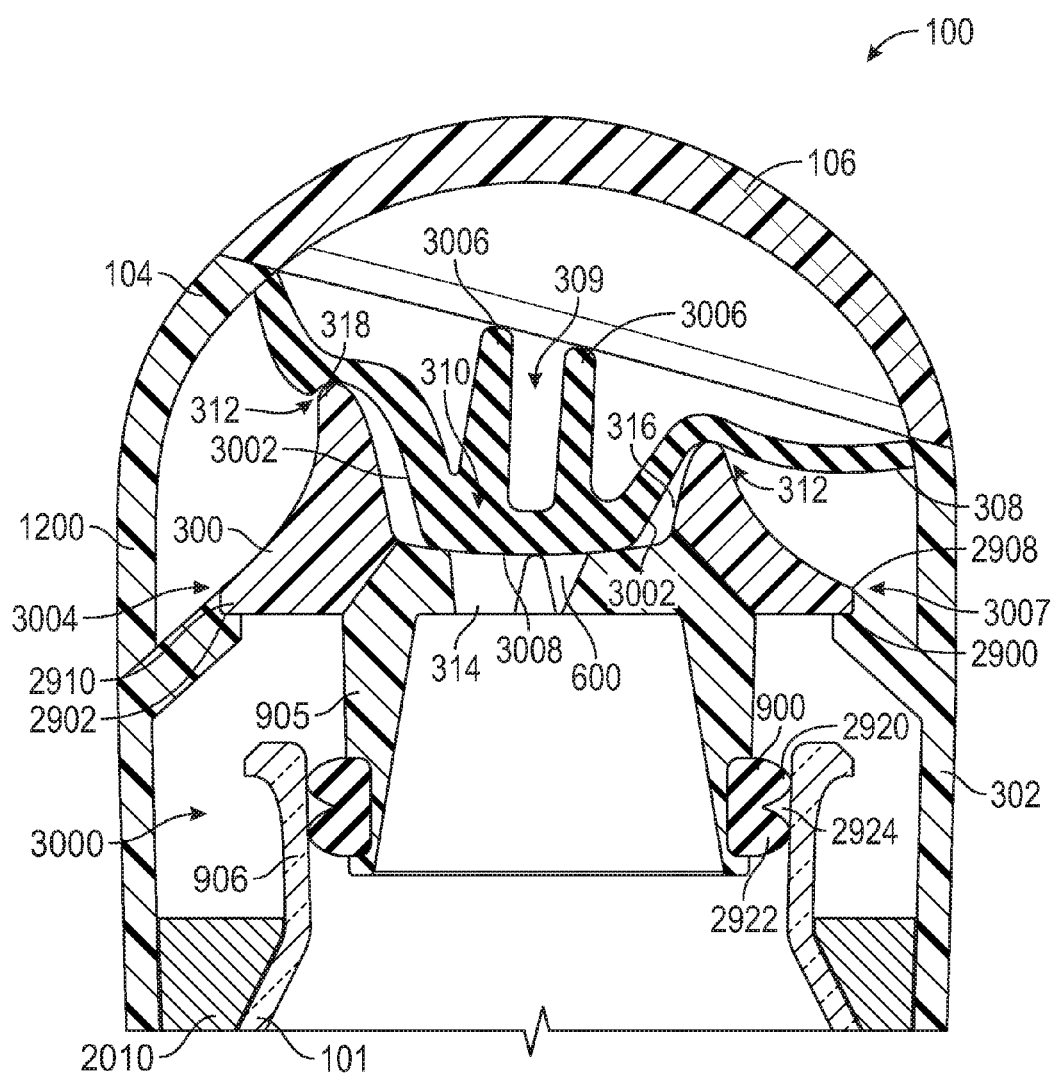
FIG. 30 is a diagram of a cross-sectional side view of a portion of an example portable beverage container in accordance with some implementations of the subject technology.

FIG. 30 shows a cross-sectional side view of a portion of portable beverage container 100 in which compressible circumferential ridges 2920 and 2922 of gasket 900 are in a compressed configuration between neck 905 of spout 300 and neck 906 of inner vessel 101. In the configuration of FIG. 30, gasket 900 can provide a seal that prevents liquid from within inner vessel 101 from exiting inner vessel 1010 at any location other than openings 314 and/or 900 of spout 300. Gasket 900 may also provide a shock-absorbing function that allows resilient movement of inner vessel 101 with respect to spout 300 in the event of a shock to container 100, the resilient movement absorbing energy that could otherwise be transferred to inner vessel 101 and cause damage thereto.

As shown in FIG. 30, an air gap 3000 may be provided between neck 906 of inner vessel 101 and base 302 of cap 108 such that the interface between cap 108 and inner vessel 101 is only through the intervening structures of spout 300, in some implementations.

The cross-sectional view of FIG. 30 also shows protrusion 2910 of spout 300 seated within cutout 2902, in one implementation, to form a smooth, continuous outer surface 3004 at the interface between spout 300 and cap 108 at the front of container 100. Protrusion 2908 of spout 300 may be seated within cutout 2900 in one implementation to form a smooth, continuous outer surface 3007 at the interface between spout 300 and cap 108 at the rear of container 100.

In the cross-sectional view of FIG. 30, a bottom surface 3008 of knob 310 is shown forming a seal over openings 314 and 600 in the closed position of lid 104. Recess 312 of elastomeric sealing member 308 is also shown wrapped over and around lip 318 of spout 300 to form a secondary leak-prevention seal in the closed position of lid 104 shown in FIG. 30. It can also be seen that, if lid 104 is opened to an intermediate position in which bottom surface 3008 is spaced away from openings 314 and 600 while knob 310 is still substantially within recess 316 of spout 300, any hot gas such as steam that is released from within inner vessel 101 through opening 314 and/or 600 will first impact the bottom surface of knob 310, then be directed along the sidewalls 3002 of knob 310 to be redirected by recess 312 so that such hot gasses are prevented from exiting container 100 with a direct path to a user's body. In this way, injuries due to gasses from hot liquids in container 100 can be reduced or eliminated.

In the example of FIG. 30, elastomeric sealing member 308 is shown having inner support structures 3006 and one or more gaps 3009 (e.g., air gaps or evacuated gaps). However, this is merely illustrative. In some implementations, elastomeric sealing member 308 may be provided without any internal gaps or may be constructed with other interior geometries to enhance the sealing and safety properties of container 100.

Figure 31:
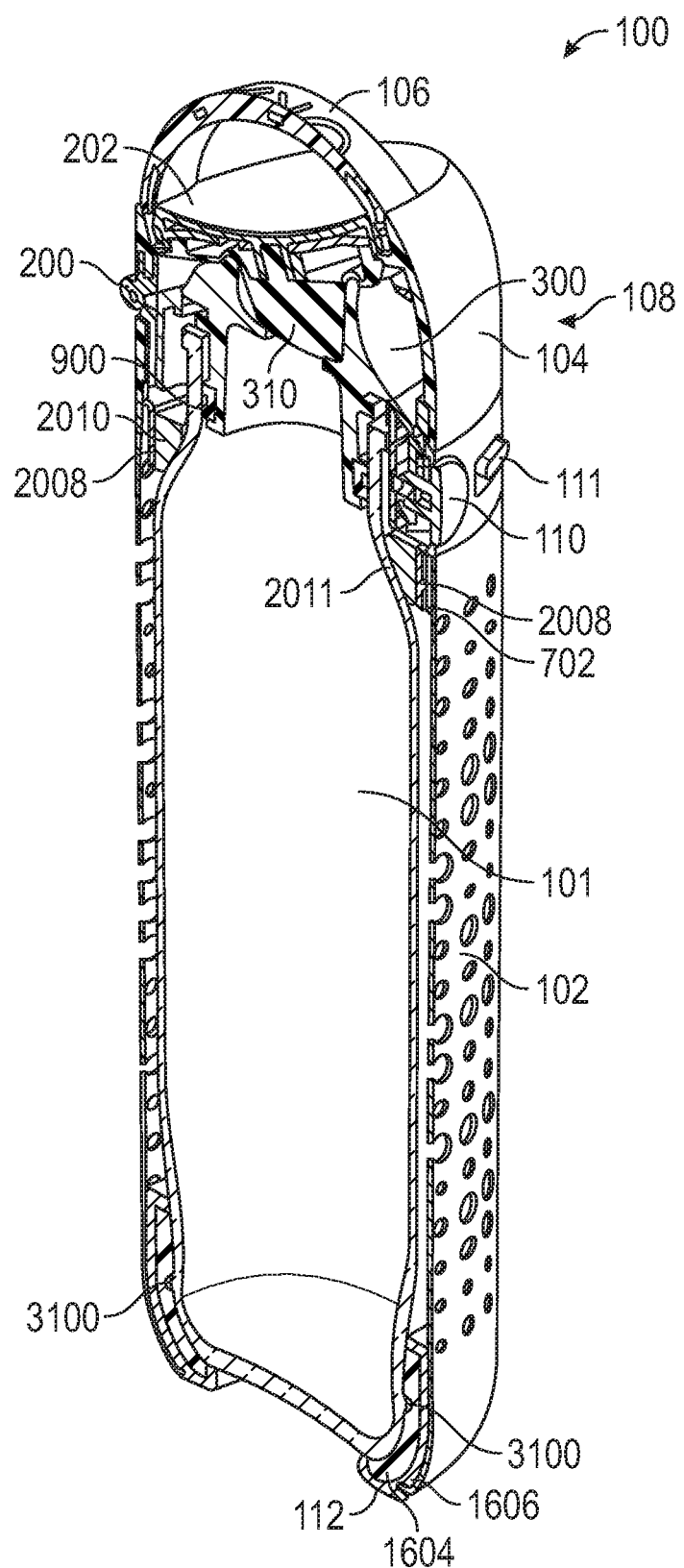
FIG. 31 is a diagram of a cross-sectional perspective view of an example portable beverage container in accordance with some implementations of the subject technology.

FIG. 31 shows a cross-sectional perspective view of container 100 in which inner vessel 101 is secured within outer shell 102 and cap 108, with lid 104 in a closed position and spout 300 secured within cap 108. In the example implementation of FIG. 31, in the fully assembled configuration of container 100, threaded ring 2008 in engaged with threaded ring 702 to secure cap 108 to outer shell 102 in a position in which upper shock absorption member 2010 is compressed against shoulder 2011 of inner vessel 101. In this way, upper shock absorption member 2010 can be arranged to cooperate with a lower shock absorption cup and a gasket such as gasket 900 around the neck of spout 300 to securely and resiliently secure inner vessel 101 within outer shell 102 and cap 108.

In the example of FIG. 31, the lower shock absorption cup is formed by an outer lower shock absorber 1606 (e.g., a silicone cup structure attached to or integrally formed with foot structure 112) and an inner lower shock absorber 1604 (e.g., a foam cup structure such as a Poron® foam cup structure). However, this is merely illustrative. In other implementations, inner vessel 101 may seat within a single lower shock absorption cup formed from silicone, foam or another resilient material.

In the example of FIG. 31, inner vessel 101 includes a circumferential ridge 3100 (e.g., an integrally formed protrusion) that is seated within a corresponding recess in inner lower shock absorption member 1606. In this way, inner vessel 101 may be provided with features for a snap fit into a seated position within outer shell 102, for stabilization prior to attachment of cap 108 to outer shell 102. However, this is merely illustrative. In other implementations, circumferential ridge 3100 may seat within a corresponding recess in a single lower shock absorption cup, the shock absorption cup may include a protrusion that seats within a corresponding recess in inner vessel 101, or inner vessel 101 may be removably secured within the lower shock absorption cup by a press fit therewith that is free of protrusion and recess structures.

In the examples of FIGS. 1-31, various exemplary implementations of components of portable beverage container 100, such as hinge 200 (e.g., including hinge members 304 and 400), button 110, locking mechanism 111, upper shock absorber 2010, lower shock absorber 1600, elastomeric sealing member 308, spout 300, tooth 306, and lid member 1300 have been described. However, it should be appreciated that other implementations of any or all of these components can be combined with the other features and components described in connection with FIGS. 1-31 as desired.

Other exemplary implementations of hinge 200 (e.g., including hinge members 304 and 400), button 110, locking mechanism 111, upper shock absorber 2010, lower shock absorber 1600, elastomeric sealing member 308, spout 300, tooth 306, and lid member 1300 are described below in connection with FIGS. 32-60.

Figure 32:
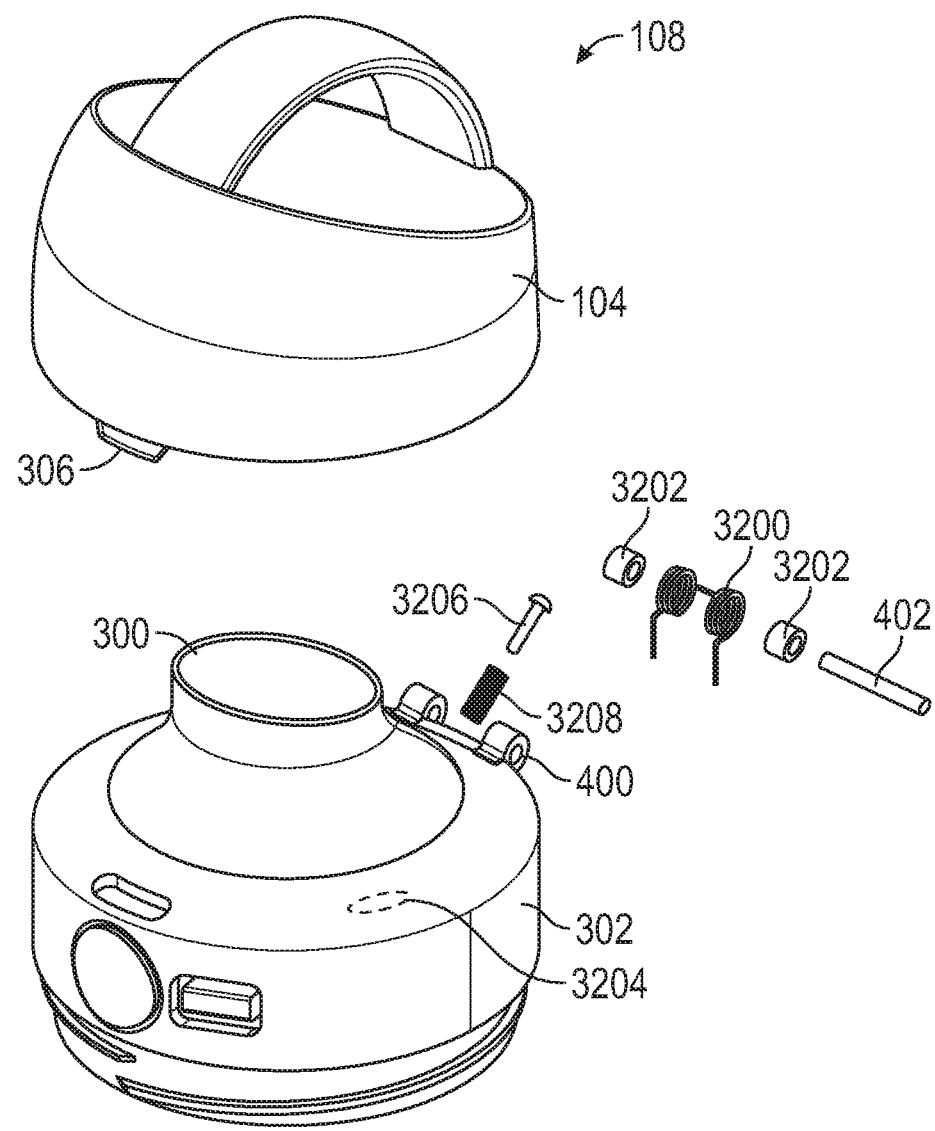
FIG. 32 is a diagram of a perspective view of an example cap for a portable beverage container in accordance with some implementations of the subject technology.
Figure 33:
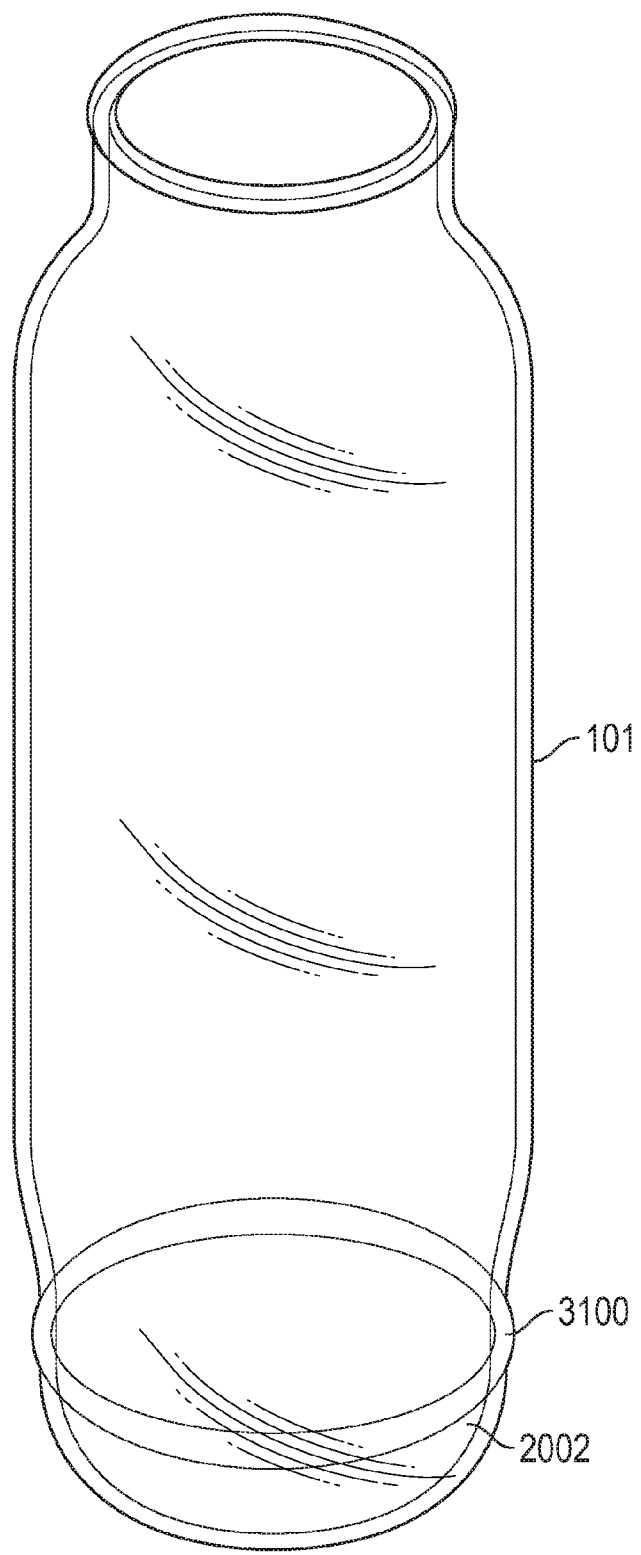
FIG. 33 is a diagram of an exploded perspective view of an example inner vessel for a portable beverage container in accordance with some implementations of the subject technology.

FIG. 32 shows a perspective view of cap 108 with lid 104 separated from base 302 so that various hinge components can be seen. In particular, hinge member 400, compression spring 3208, pin 3206, torsion spring 3200, filler springs 3202 and pin 402 for one implementation of the hinge between base 302 and lid 104 are shown. Torsion spring 3200 may (e.g., a double torsion spring) resides between the barrels of the upper and lower hinge members 304 and 400, with the hinge pin 402 passing through its loops. Torsion spring 3200 provides a spring force to open the lid. FIG. 32 also shows an optional latch button 3204 (sometimes referred to as a release button) compressible to unlatch spout 300 in an implementation in which an internal latching mechanism is provided to lock spout 300 in base 302. FIG. 33 shows an implementation of inner vessel 101 having a protrusion 3100 on base 2002 as described above in connection with, for example, FIG. 31.

Figure 34:
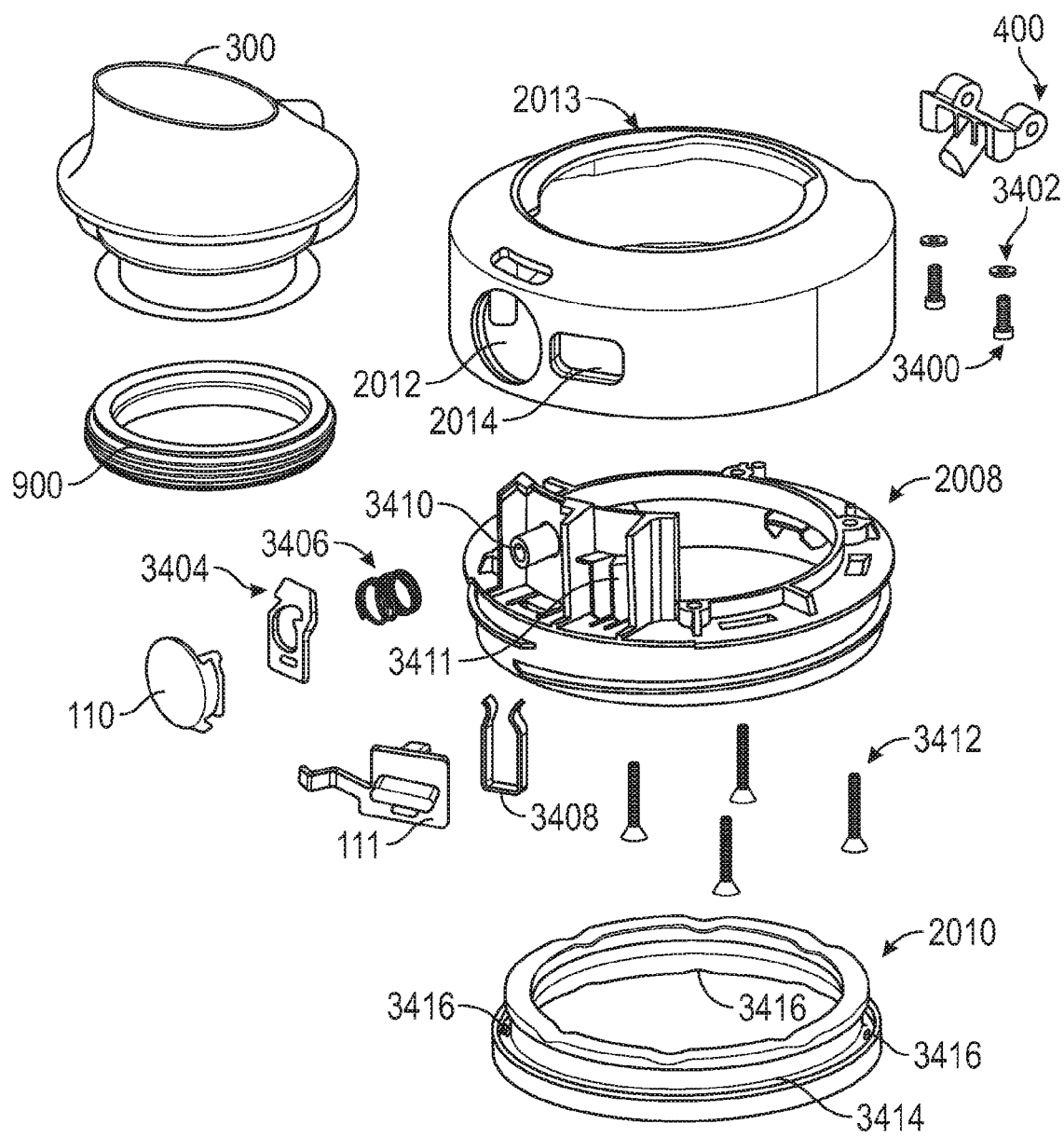
FIG. 34 is a diagram of an exploded perspective view of an example cap base for a portable beverage container in accordance with some implementations of the subject technology.

FIG. 34 shows an exploded perspective view of base 302 and spout 300. In the example of FIG. 34, first base member 2013 (e.g., a rigid plastic member) having openings 2012 and 2014 is secured to hinge member 400 by screws 3400 (e.g., with intervening washers 3402) and to thread member 2008 by screws 3412. FIG. 34 also shows how button 110 and locking member 111 may include a finger mechanism 3404, a button spring 3406 and a lockout spring 3408. Lockout spring 3408 may be mounted to linear protrusions 3411 that also guide the movement of locking member 111. Button spring may be disposed over protrusion 3410 which also passes through an opening in finger mechanism 3404. FIG. 34 also shows an implementation of upper shock absorber 201 having a recess 3414 for mounting to thread member 2008 and opening 3416 that allow drainage through upper shock absorber 2010 (e.g., into the space between inner vessel 101 and shell 102. For assembly of base 302, hinge member 400 is first assembled into molded plastic member 2013. Button 110 and locking mechanism 111 are assembled into the front of the thread member 2008, which is then inserted up into molded plastic member 2013. Screws 3142 may then be turned to secure the resulting assembly together. Gasket 900 may then be stretched onto spout 300, which can be inserted into the resulting base assembly and rotated to lock in place. Upper shock absorber 2010 may then be pressed up into the bottom of the thread member 2008.

Figure 35:
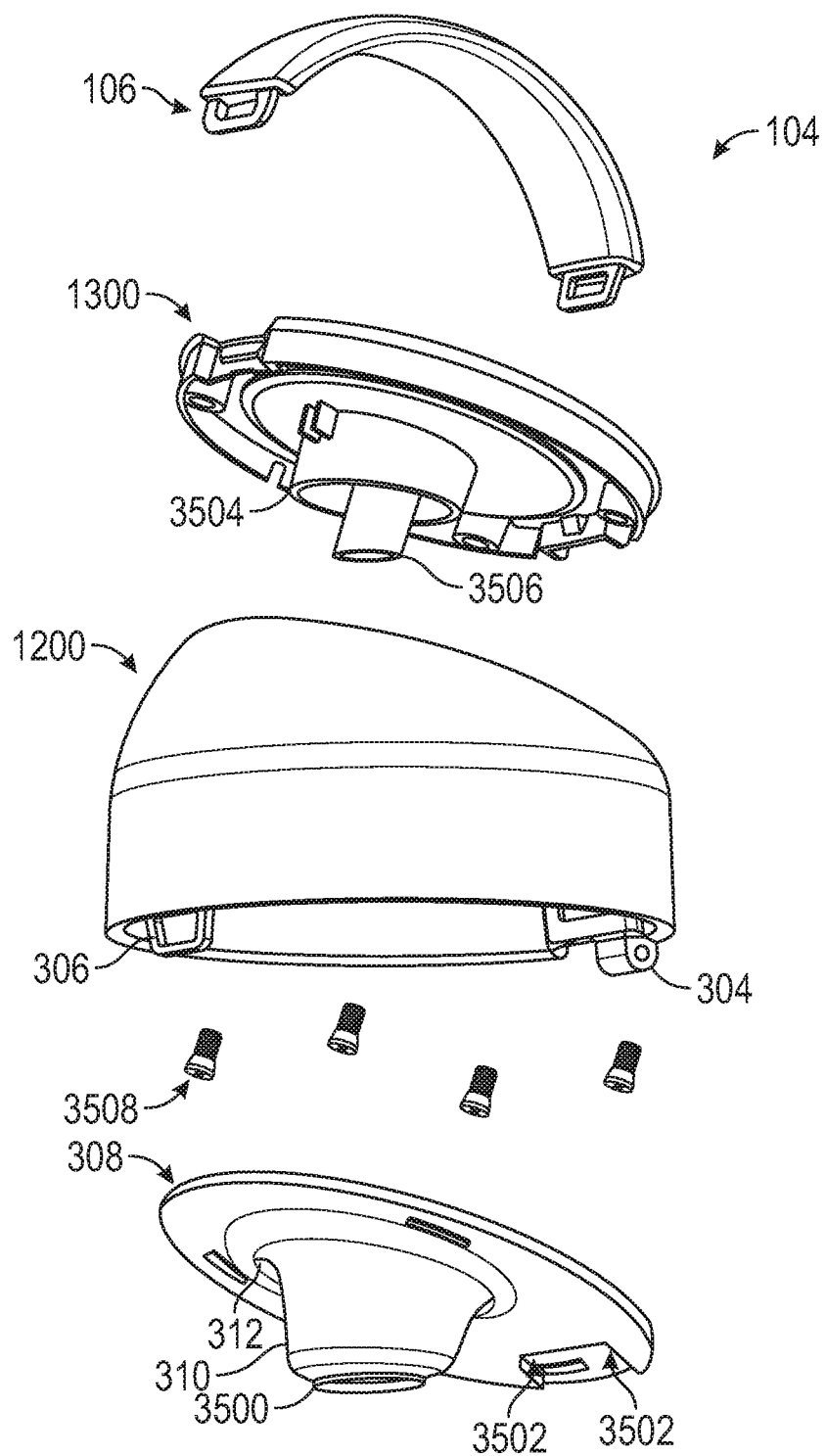
FIG. 35 is a diagram of a perspective view of an example lid for a portable beverage container in accordance with some implementations of the subject technology.

FIG. 35 shows an exploded perspective view of lid 104. In the example of FIG. 35, knob 310 of elastomeric sealing member 308 includes an additional ridge 3500 (e.g., a ring-shaped ridge on the knob). Ridge 3500 is sized and configured to be pressed to extend into opening 314 in spout 300 when cap 108 is attached to shell 102 and lid 104 is closed to provide an additional seal that complements the seal formed by recess 312 over the lip of spout 300 and to center sealing knob 310 on drinking hole 314 in spout 300. As shown, lid member 1300 (in this implementation) includes an outer rib 3504 onto which an inner surface of knob 310 stretches and an inner rib 3506. Inner rib 3506 extends into an interior cavity in the knob and pushes on an inner surface of knob 310 to push knob 310 onto the surface of spout 300 and ridge 3500 into opening 314 when lid 104 is closed. Molded lid member 1200 may be attached to lid member 1300 by screws 3508. In some examples, portions such as portions 3502 of elastomeric sealing member 308 (or corresponding portions of lid member 1300) may be provided with protrusions (not shown) that engage with fin 504, when lid 104 is closed, to prevent rotation of spout 300 when lid 104 is closed. For assembly of lid 104, handle 106 is snapped onto the lid member 1300, which is pressed into the molded lid member 1200 and secured with screws 3508. Sealing member 308 presses into the lid member 1200 as described herein.

Figure 36:
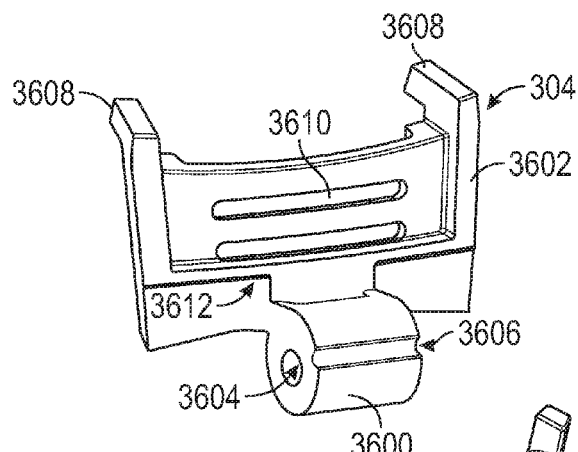
FIGS. 36 and 37 are diagrams of perspective views of a hinge member for a portable beverage container in accordance with some implementations of the subject technology.
Figure 37:
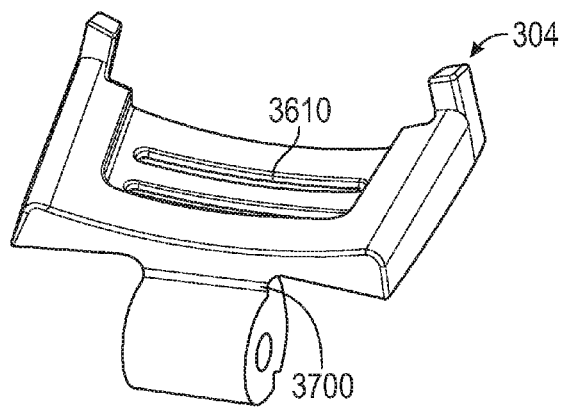

FIGS. 36 and 37 show perspective views of hinge member 304 in an implementation in which hinge member 304 includes a base portion 3602 configured to be overmolded into lid member 1200 and hinge barrel 3600 extending from base portion 3602. Hinge barrel 3600 includes an opening 3604 for receiving hinge pin 402 and notch 3606 that forms a portion of a hinge detent that secures lid 104 in an open position until deliberately closed by a user and prevents the lid from inadvertently closing while the user is drinking from container 100. Base portion 3602 also includes molding features such as arms 3608, openings 3610 and ledge 3612 that help retain based portion 3602 within base portion 3602 within lid member 1200. Ledge 3700 provides a landing platform for lid spring 3200.

Figure 38:
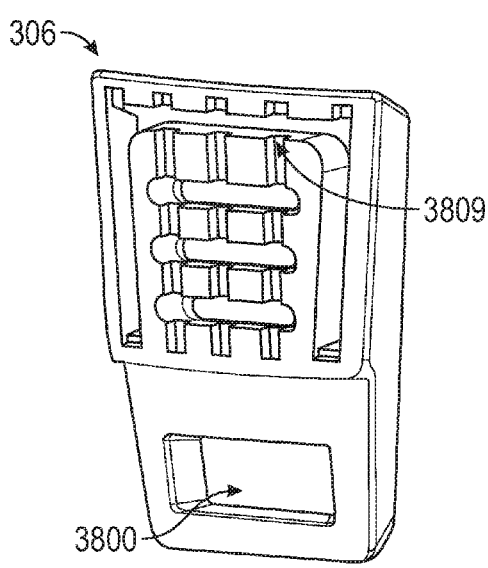
FIGS. 38 and 39 are diagrams of perspective views of a latch member for a lid of a portable beverage container in accordance with some implementations of the subject technology.
Figure 39:
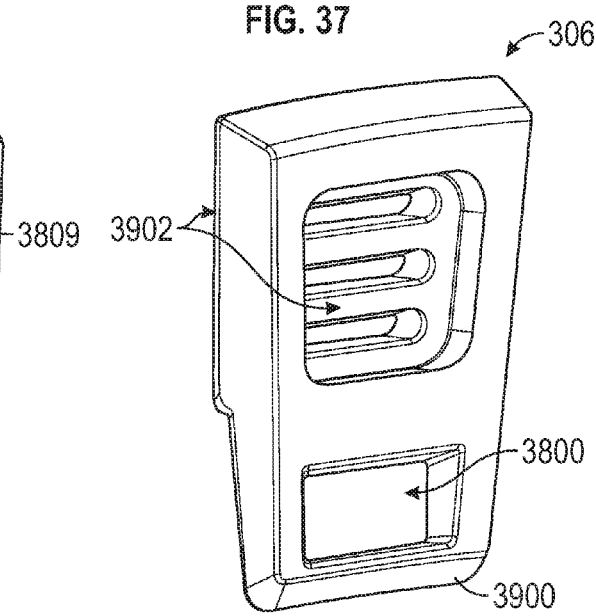
Figure 40:
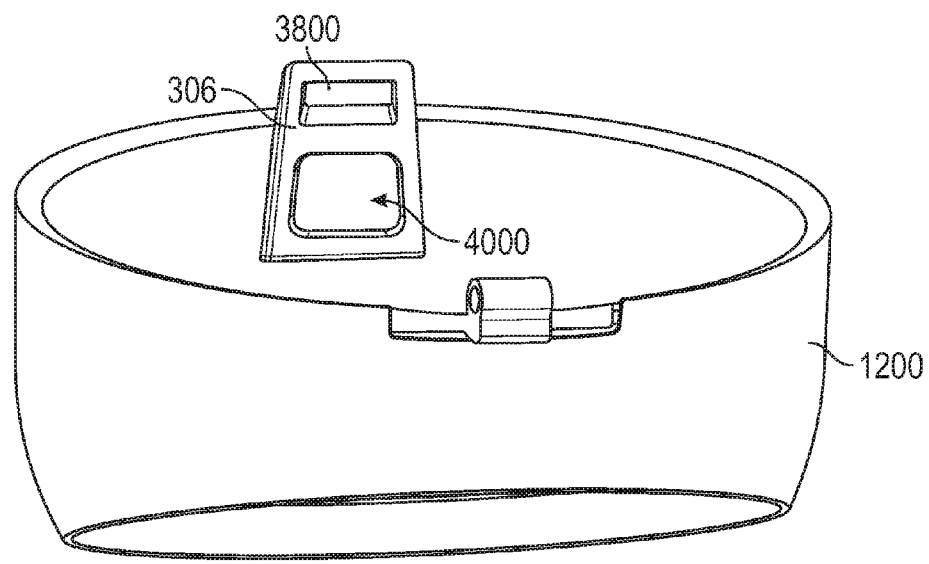
FIGS. 40 and 41 are diagrams of perspective views of a lid member of a portable beverage container in accordance with some implementations of the subject technology.
Figure 41:
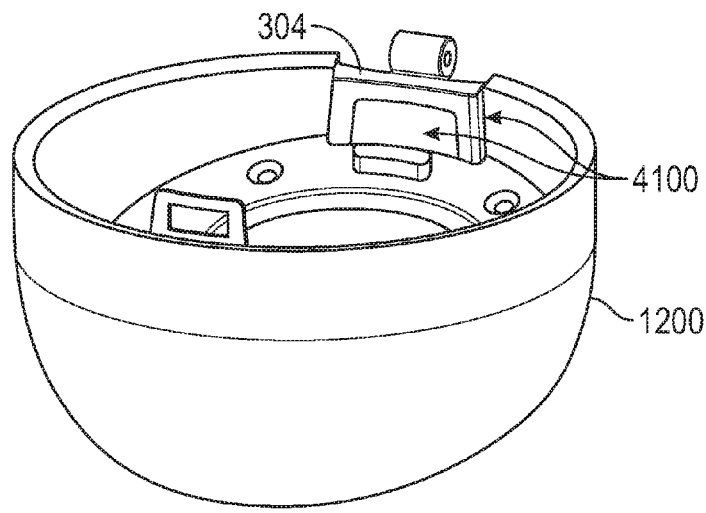
Figure 42:
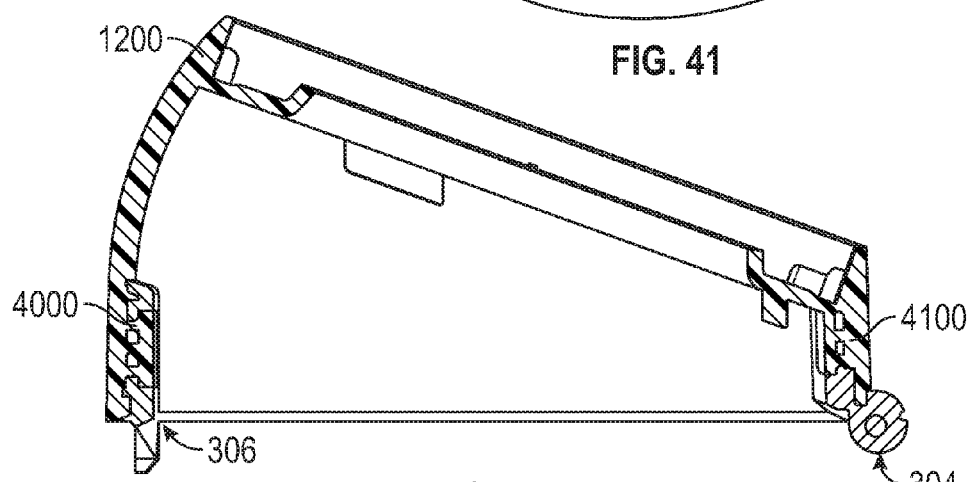
FIG. 42 is a diagram of a cross-sectional side view of the lid member of FIGS. 40 and 41 in accordance with some implementations of the subject technology.

FIGS. 38 and 39 show perspective views (front and rear) of tooth showing molding features 3809 and 3902 for securing tooth 306 within lid member 1200 such that a lower portion including opening 3800 (for receiving a latch portion of button 110) and a cam surface 3900 (for moving the latch portion as lid 104 is closed) extend from lid member 1200 as shown in, for example, FIGS. 35, and 40-42. As shown in FIGS. 40-42, plastic 4000 of lid member 1200 fills and surrounds the molding features of tooth 306 and plastic 4100 of lid member 1200 fills and surrounds the molding features of hinge member 304 to position and secure tooth 306 and hinge member 304 within the lid member.

Figure 43:
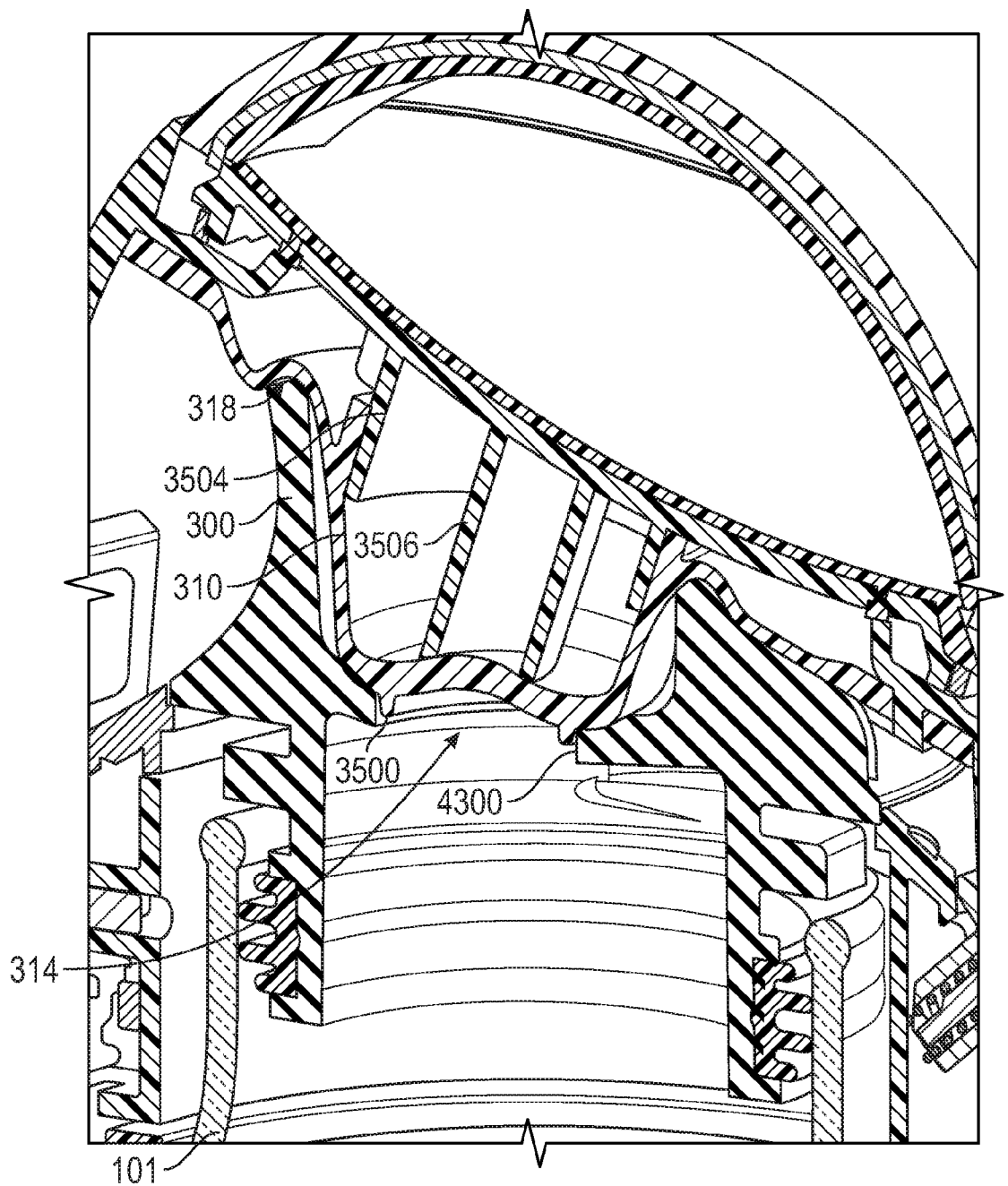
FIG. 43 is a diagram of a cross-sectional perspective view of a portion of an example portable beverage container in accordance with some implementations of the subject technology.
Figure 44:
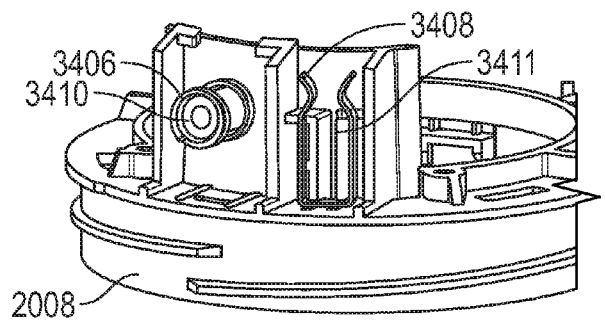
FIGS. 44, 45, 46, and 47 are diagrams showing perspective views of a portion of an example portable beverage container during various stages of assembly of a button and locking mechanism in accordance with some implementations of the subject technology.

FIG. 43 shows a cross-sectional view of a portion of an assembled portable beverage container with cap 108 attached to shell 102 and lid 104 closed such that ridge 3500 is pressed into opening 314 of spout 300 to engage with inner edge 4300 of opening 314 by protrusion 3506 of lid 104. Recess 312 is also shown extending over the lip of spout 300.

Figure 45:
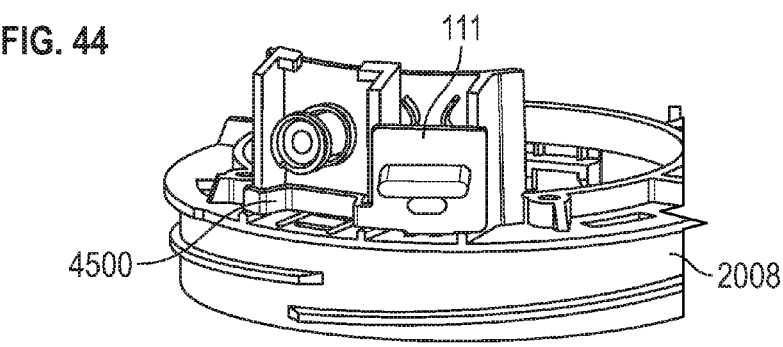
Figure 46:
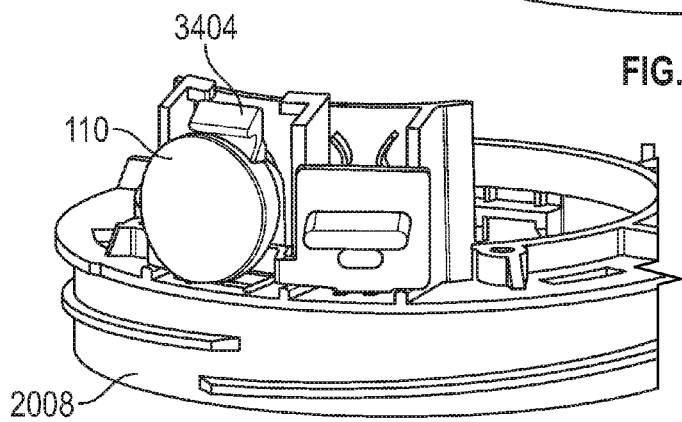
Figure 47:
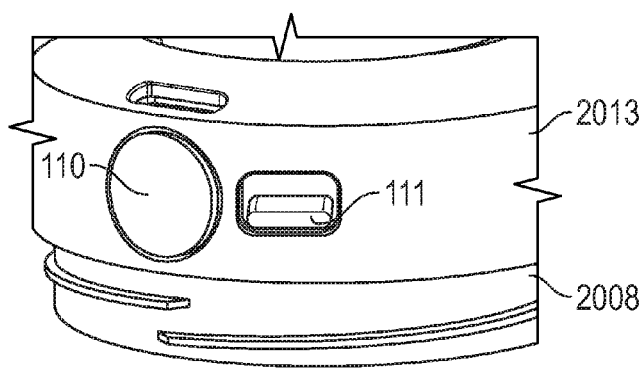

FIGS. 44-47 show various stages of the assembly of button 110 and locking member 111 in accordance with some aspects. As shown in FIG. 4, compression spring 3406 may be placed onto cylindrical protrusion 3410 and locking spring 3408 may be wrapped at least partially around linear protrusions 3411. As shown in FIG. 45, locking mechanism 111 may then be placed over locking spring 3408 such that locking bar 4500 extends laterally therefrom under protrusion 3410. Finger mechanism 3404 and button member 110 may then be placed over protrusion 3410 by compressing spring 3406. Member 2013 may then be placed onto thread member 2008 such that button member 110 and locking member 111 extend, respectively into openings 2012 and 2014.

Figure 48:
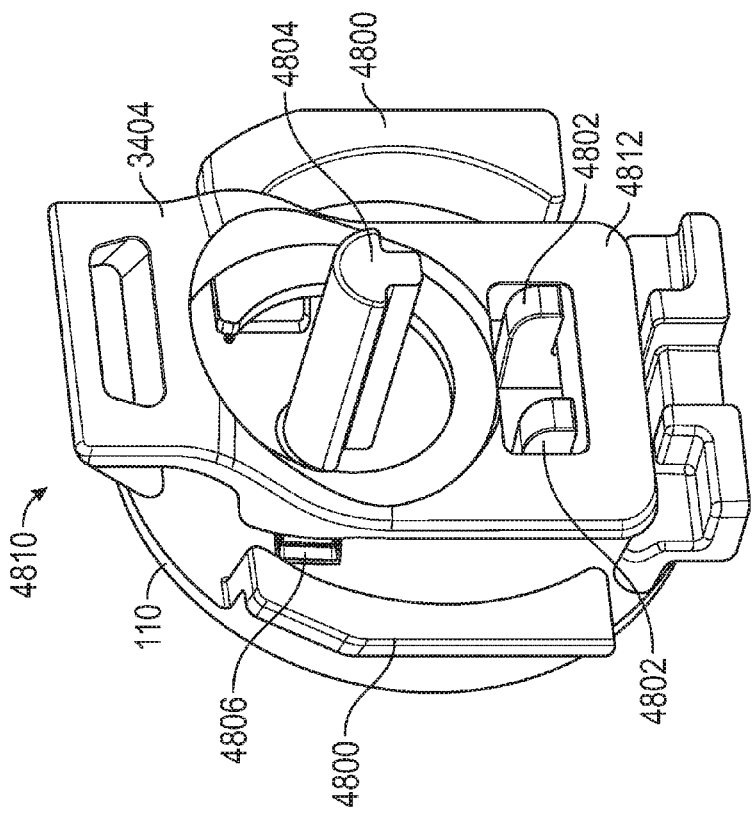
FIG. 48 is a diagram of a perspective view of an example button member and finger mechanism for a portable beverage container in accordance with some implementations of the subject technology.

A rear perspective view of button member 110 and finger mechanism 3404 is shown in FIG. 48. As shown in FIG. 48, an interior surface of button member 110 may include rib surfaces 4800 that contact locking bar 4500 when locking mechanism 111 is raised into a locked position (to prevent actuation of button member 110 and finger mechanism 3404), protrusions 4802 that form a pivot surface for pivot section 4812 of finger mechanism 3404, pin protrusion 4804 that extends into an opening in thread member 2008 to provide a smooth, guided linear motion of button 110 and finger mechanism 3404 when button member 110 is pushed or released, and ribs 4806 that prevent finger mechanism 3404 from rotating too far forward.

Figure 49:
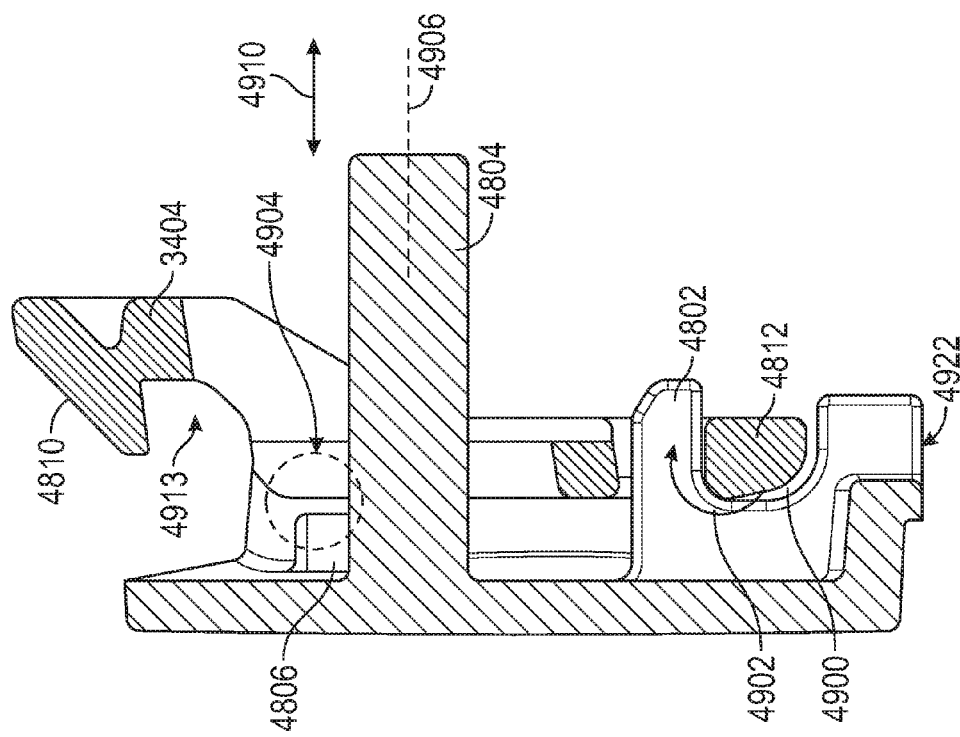
FIG. 49 is a diagram of a cross-sectional side view of an example button member and finger mechanism for a portable beverage container in accordance with some implementations of the subject technology.

FIG. 49 shows a cross-sectional side view of button member 110 and pivotable finger mechanism 3404 showing how pivot portion 4812 of finger mechanism 3404 may rotate (see, e.g., arrow 4902) in a recess 4900 formed, in part by protrusions 4802. Finger mechanism 3404 may be rotated when cam surface 3900 of tooth 306 contacts cam surface 4810 of finger mechanism 3404. FIG. 49 also shows arrows 4910 that indicate the direction of linear movement of both button member 110 and finger mechanism 3404, as guided along axis 4906 of pin 4804, when button member 110 is pushed or released. Axis 4906 is positioned above the pivot axis of finger mechanism 3404 (at pivot portion 4812), so that spring 3406 always pushes the finger mechanism 3404 forward.

FIG. 49 also shows a gap 4904 between finger mechanism 3404 and pushing ribs 4806 of the button member 110 (when the finger mechanism 3404 is in a latched position). Gap 4904 prevents button member 110 from disengaging latch recess 4913 from tooth 306 which would otherwise pop lid 104 open during drop events for container 100. A zero-draft bottom surface 4922 of button member 110 may ride on corresponding zero-draft ribs in the thread member 2008, providing an anti-rotation function for button member 110.

Figure 52:
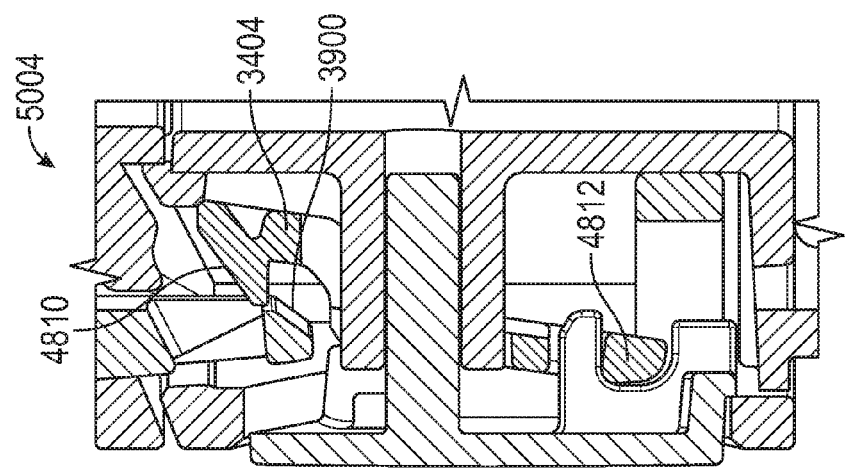
FIGS. 50, 51, and 52 are diagrams showing cross-sectional side views of a portion of an example button member during various stages of operation in accordance with some implementations of the subject technology.
Figure 51:
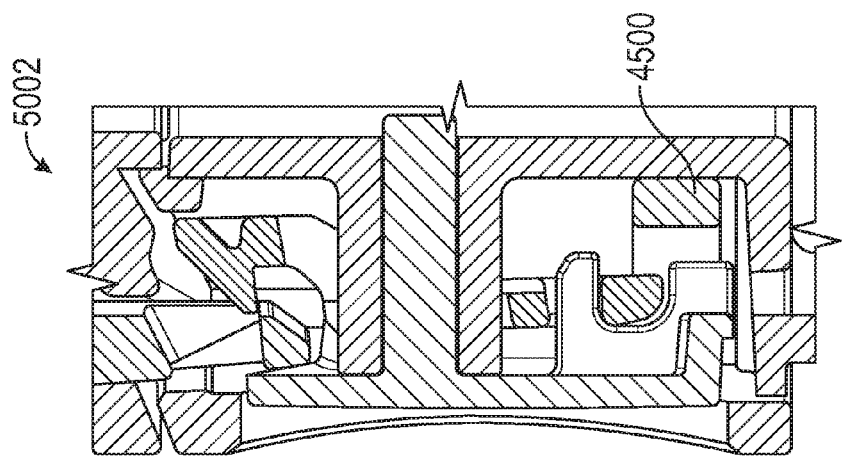
Figure 50:
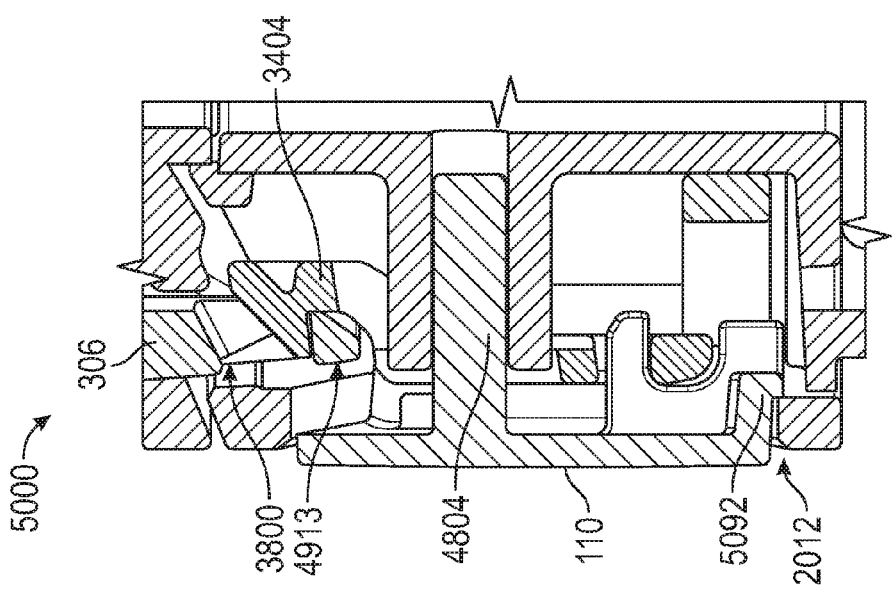

FIGS. 50, 51, and 52 show cross-sectional side views a portion of portable beverage container in a latched configuration (5000), a lid-opening configuration (5002), and a lid-closing configuration (5004) respectively in accordance w. In latched configuration 5000, tooth 306 is latched in latching recess 4913 with a portion of finger mechanism 3404 extending into opening 3800 of tooth 306. Spring 3406 (not visible in FIG. 50) pushes finger mechanism 3404 outward, which pushes the button member 110 outward. Lip 5042 of button member 110 catches on inside of opening 2012. In lid-opening configuration 5002, as button 110 is pressed in, finger mechanism 3404 follows straight back, compressing spring 3406, noting that, if lockout bar 4500 was raised into a locked position, button member 110 would be prevented from moving from latched configuration 5000 to lid-opening configuration 5002. In lid-closing configuration 5004, as lid 104 closes, cam surface 3900 of tooth 306 bears against cam surface 4810 of the latch hook of finger mechanism 3404 causing finger mechanism 3404 to pivot backwards allowing tooth 306 to be extended downward until finger mechanism 3404 snaps back into latched configuration 5000. As tooth 306 is extended downward by the closing of lid 104, button member 110 remains pushed out by spring 3406 and is therefore rattle-free.

Figure 53:
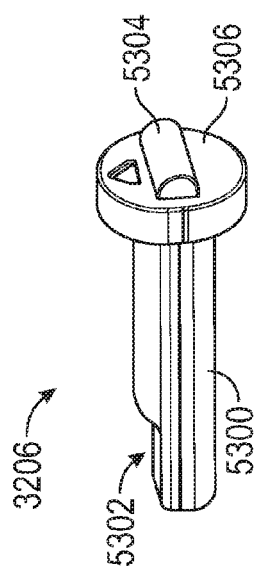
FIG. 53 is a diagram of a perspective view of an example detent pin for a portable beverage container in accordance with some implementations of the subject technology.
Figure 54:
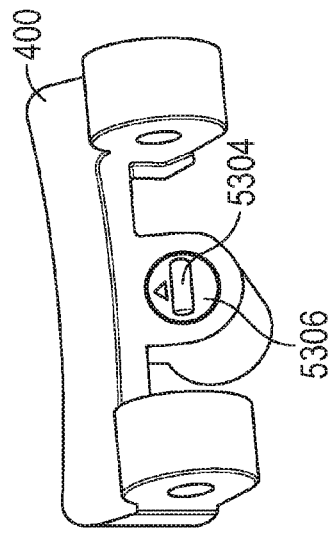
FIGS. 54 and 55 are diagrams of a perspective views of an example hinge member with a detent pin for a portable beverage container in accordance with some implementations of the subject technology.
Figure 55:
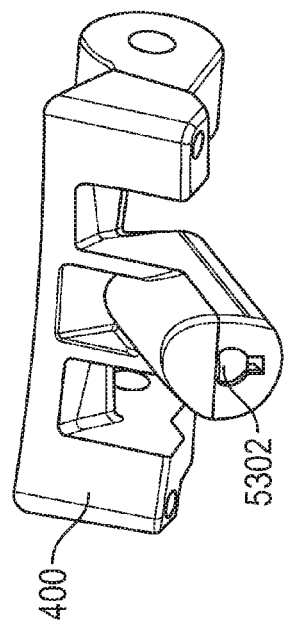
Figure 56:
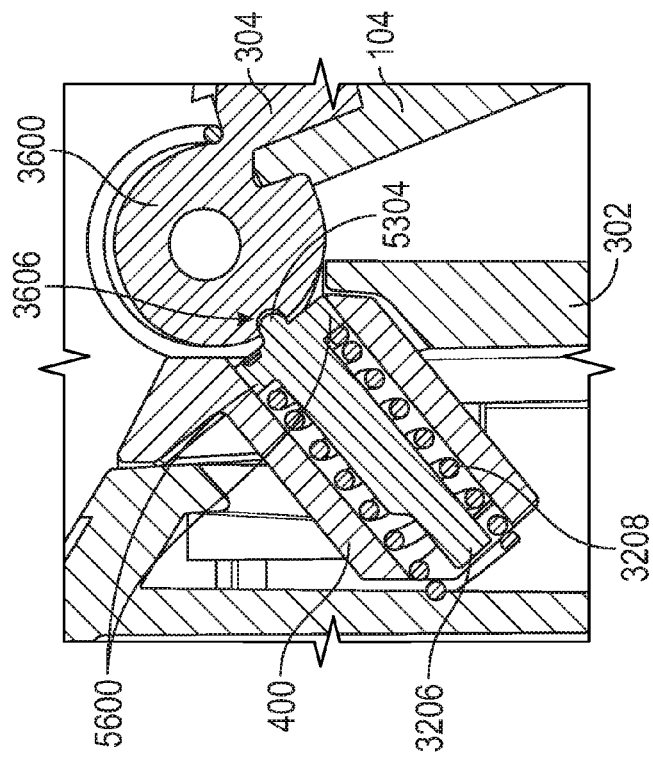
FIG. 56 is a diagram of a cross-sectional view of an example hinge member with a detent pin for a portable beverage container in accordance with some implementations of the subject technology.

FIGS. 53-55 show various features of hinge 200 in a configuration in which a detent is provided that, when lid 104 is in a fully open position, prevents the lid from falling closed (e.g., while the user is drinking from spout 300). As shown in FIG. 53, pin 3206 includes a cylindrical shaft 5300, a head 5306 having a linear protrusion 5304, and a notch 5302 in the cylindrical shaft. FIG. 54 shows a front view of pin 3206 disposed in a cavity in hinge member 400 such that head 5306 is substantially flush with an outer surface of hinge member 400 and protrusion 5304 extends beyond the outer surface. FIG. 55 shows a rear view of pin 3206 in which a flat surface formed by notch 5302 bears against a correspondingly shaped surface of a rear opening in hinge member 400 to prevent rotation of pin 3206. FIG. 56 shows a cross-sectional side view of a portion of portable beverage container 100, with lid 104 in a fully-open position and hinge member 400 mounted in base 302. As shown, the detent mechanism includes pin 3206 as a spring-loaded detent pin that is pushed outward by spring 3208 and guided by contacts 5600 between head 5306 and a cavity within hinge member 400 (in which pin 3206 and spring 3208 are disposed). During rotation of lid 104, protrusion 5304 rides against a cam surface on hinge barrel 3600 of hinge member 304 mounted in lid 104 and "falls" into notch 3606 in barrel 3600 to secure the lid in the fully open position until the user applies enough rotational force on the lid to compress spring 3208 to move protrusion 5304 out of notch 3606.

Figure 57:
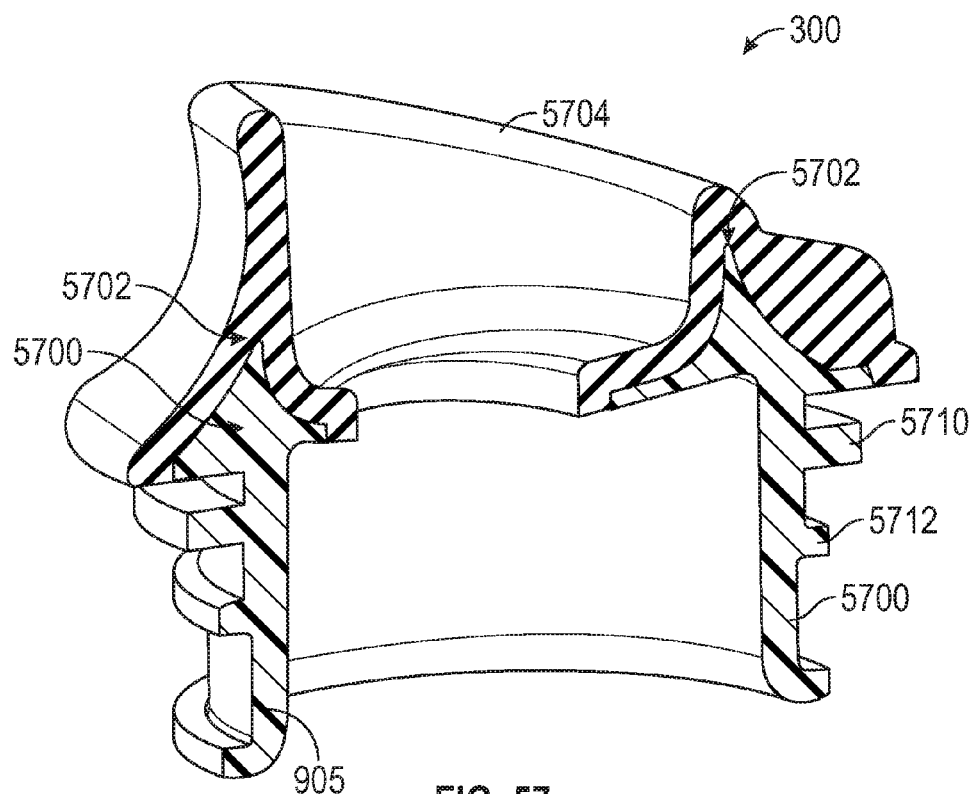
FIG. 57 is a diagram of a cross-sectional perspective view of an example spout for a portable beverage container in accordance with some implementations of the subject technology.

FIG. 57 shows a cross-sectional view of spout 300 in an implementation in which the spout has been formed in a two-shot molding process using a double shot of the same material (e.g., a clear Grilamid® nylon 12 material). As shown in FIG. 57, a first shot 5700 and a second shot 5704 can be used to form neck 905 and thick-walled portions of spout 300 near the peaks 5702 of the first shot. First shot 5700 includes the neck 905 of spout 300 with snap fingers 5710 (for snapping spout 300 into a locked position in cap 108) and gasket ribs 5712. Second shot 5704 may be mostly a consistent thickness wall (e.g., a 2 mm wall) over the top of first shot 5700 with additional thickness at various locations to form the angled lip and rear fin of spout 300 as described herein. Although there is a visible interface between the two shots in FIG. 57, this is merely for illustrative purposes for this discussion and the final spout 300 may be a substantially clear monolithic part without a visible interface between the two shots.

Figure 58:
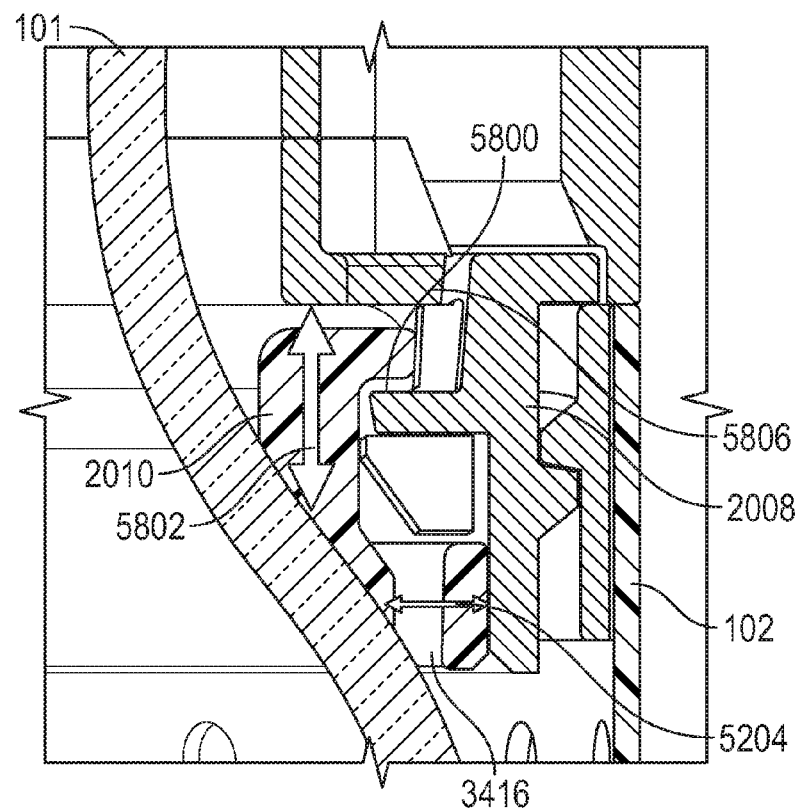
FIG. 58 is a diagram of a cross-sectional perspective view of a portion of an example upper shock absorber implemented in a portable beverage container in accordance with some implementations of the subject technology.
Figure 59:
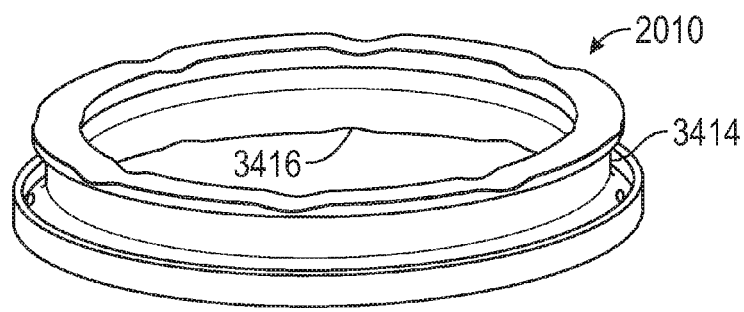
FIG. 59 is a diagram of a perspective view of an example upper shock absorber for a portable beverage container in accordance with some implementations of the subject technology.

FIGS. 58-61 show various aspects of upper shock absorber 2010 and lower shock absorber 1600 that may be provided in portable beverage container 100. FIG. 58 shows a cross-sectional perspective view of a portion of container 100 with upper shock absorber 2010 compressed between inner vessel 101 and thread member 2008 of cap 108 while cap 108 is attached to outer shell 102. FIG. 59 shows upper shock absorber 2010 separately for clarity. As shown in FIG. 58, upper shock absorber 2010 may be retained on thread member 2008 by "snapping" recess 3414 over one or more ledges 5800 around an inner periphery of thread member 2008. In the configuration shown in FIG. 58, upper shock absorber 2010 competes with spout gasket (not visible in FIG. 58) in guiding the neck of inner vessel 101 to be concentric with spout 300 and cap 108. In this configuration, upper shock absorber 2010 provides the most absorption in the axial or vertical direction (as indicated by arrows 5802 and less in the radial or horizontal directions (as indicated by arrows 5804). Force is transferred through the thick wall of absorber 2010 vertically up to shelf 5806 in the thread member 2008. Lesser forces are transferred horizontally because the spout gasket is also contributing to shock absorption in the horizontal/radial directions.

Figure 60:
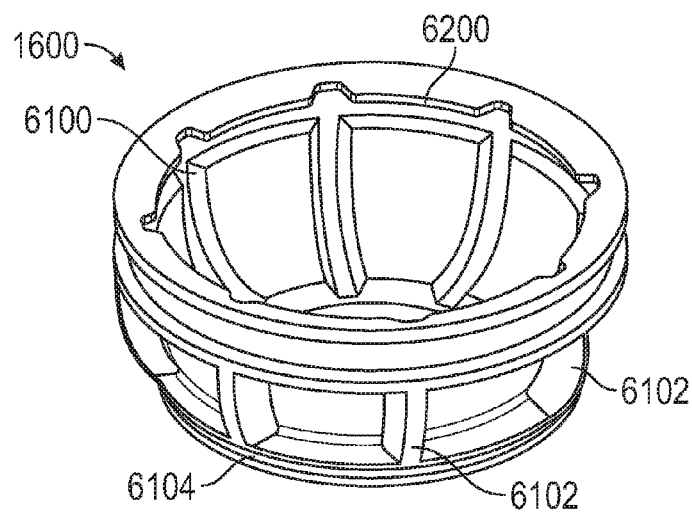
FIG. 60 is a diagram of a perspective view of an example lower shock absorber for a portable beverage container in accordance with some implementations of the subject technology.
Figure 61:
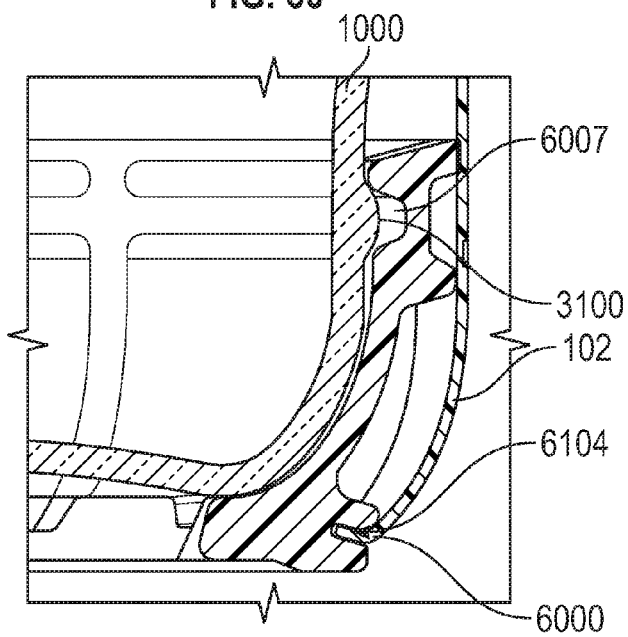
FIG. 61 is a diagram of a cross-sectional perspective view of a portion of an example lower shock absorber implemented in a portable beverage container in accordance with some implementations of the subject technology.

FIG. 61 shows a cross-sectional perspective view of a portion of container 100 with lower shock absorber 1600 disposed between inner vessel 101 and shell 102. FIG. 60 shows lower shock absorber 1600 separately for clarity. As shown in the example of FIG. 60, lower shock absorber 1600 includes drainage channels 6100 that allow condensation from the exterior of inner vessel 101 to drain down an out of the container at the bottom, rather than spill onto the user when they drink. Ribs 6102 on the outside of absorber 1600 save weight and flex to absorb shock energy. Lower shock absorber 1600 also includes a circumferential recess 6200 configured to receive circumferential protrusion 3100 on inner vessel 101 to provide a snap fit securement of vessel 101 within shell 102. In the configuration of FIG. 61, lower shock absorber 1600 is retained on a small inward rim 6000 at the bottom of shell 102 by a recess 6104 that fits over and onto rim 6000. In the configuration of FIGS. 60 and 61, a bottom surface of lower shock absorber 1600 forms the bottom surface of the fully assembled portable beverage container 100.

Figure 62:
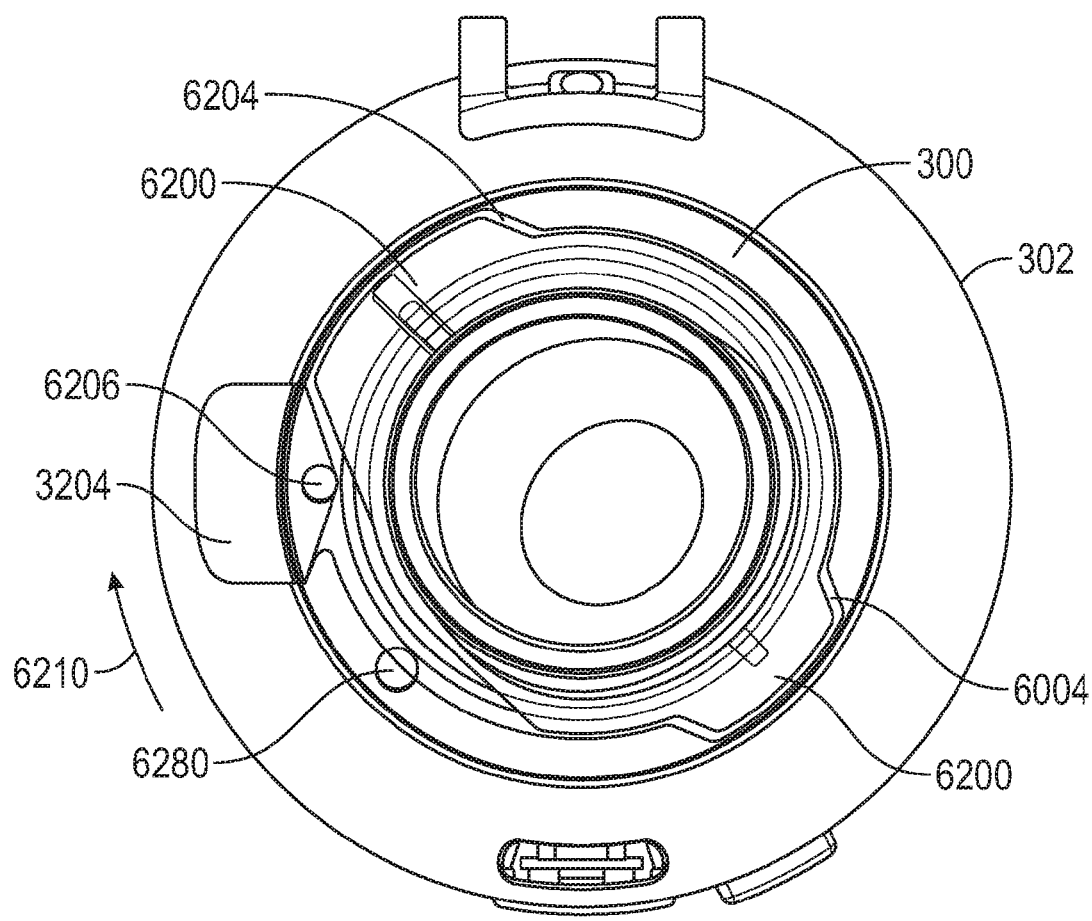
FIG. 62 is a diagram of a top view of a portable beverage container with a lid removed in accordance with some implementations of the subject technology.

FIG. 62 shows a top view of portable beverage container 100 (with lid 104 removed), in an example in which spout 300 and base 302 of cap 108 are implemented with cooperating latching features. As shown through the transparent material of spout 300 in the example of FIG. 62, spout 300 may include alignment protrusions 6200 configured to pass through corresponding alignment openings 6204 on an internal shelf within base 302 when spout 300 is rotated for insertion or removal from cap 108. As spout 300 is inserted into cap 108 with alignment protrusions 6200 aligned with alignment openings 6204 as shown in FIG. 62, an interior surface of spout 300 pushes downward on a raised knob 6206 on release button 3204, thereby compressing a spring (not visible in FIG. 62) that biases button 3204 upward. In order to lock spout 300 within base 302, spout 300 is rotated (as indicated by arrow 6210) until a recess 6208 on the interior surface of spout 300 aligns with knob 3204 and knob 3204 "falls" upward due to the force of the spring into recess 6208, thereby locking spout 300 from rotation until the user compresses button 3204 to release the spout.

In accordance with various implementations, a portable beverage container is disclosed herein that provides a more hygienic, damage-resistant product for storing and carrying liquids such as drinkable liquids.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel operations may be advantageous. Moreover, the separation of various system components in the aspects described above should not be understood as requiring such separation in all aspects, and it should be understood that the described components and systems can generally be integrated together in a single product or packaged into multiple products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A portable beverage container, comprising:
   a glass vessel having a narrowed neck;
   a metal outer shell configured to surround a first portion of the glass vessel;
   a cap configured to engage with the metal outer shell to surround a second portion of the glass vessel;
   an amorphous thermoplastic spout having a neck configured to be inserted through an opening in the cap and into the neck of the glass vessel, wherein the spout is configured to securely engage with the cap; and
   a gasket extending radially outwardly from an outer surface of the spout, the gasket sealing against the neck of the glass vessel when positioned within the neck.

2. The portable beverage container of claim 1, further comprising a gasket configured to be disposed between the neck of the spout and the neck of the glass vessel to prevent leakage between the neck of the spout and the neck of the glass vessel and to provide shock absorption between the neck of the spout and the neck of the glass vessel.

3. The portable beverage container of claim 2, wherein the gasket is an elastomeric ring configured to be mounted on an outer surface of the neck of the spout.

4. The portable beverage container of claim 1, wherein the cap comprises a base and a hinged lid that is rotatable with respect to the base to provide drinking access to the spout.

5. The portable beverage container of claim 4, further comprising:
   a latching mechanism on the hinged lid configured to be engaged within an opening in the base when the hinged lid is in a closed position to secure the hinged lid in the closed position.

6. The portable beverage container of claim 5, wherein the latching mechanism comprises a portion of a rigid cap ring that is overmolded within the hinged lid.

7. The portable beverage container of claim 6, wherein the hinged lid comprises a hinge member configured to rotatably couple to a corresponding hinge member on the base.

8. The portable beverage container of claim 7, wherein the hinge member of the hinged lid comprises a portion of the rigid cap ring.

9. The portable beverage container of claim 5, further comprising a button disposed on a sidewall of the base and configured to disengage the latching mechanism in the opening in the base to allow the hinged lid to move from the closed position to an open position.

10. The portable beverage container of claim 9, further comprising a switch disposed on the sidewall of the base and operable to prevent or allow operation of the button.

11. The portable beverage container of claim 10, wherein the switch protrudes from the sidewall further than the button protrudes from the sidewall to prevent unintentional operation of the button during a fall of the portable beverage container.

12. The portable beverage container of claim 1, further comprising a threaded structure on an inner surface of the outer metal shell, wherein the threaded structure is configured to engage with a corresponding threaded structure on the cap to secure the cap to the metal outer shell.

13. The portable beverage container of claim 1, further comprising a shock-absorbing cup disposed within the outer metal shell and configured to receive a bottom end of the glass vessel.

14. The portable beverage container of claim 13, further comprising a shock-absorbing ring disposed on an inner surface of the cap, wherein the glass vessel comprises a shoulder configured to bear against the shock-absorbing ring when the bottom end of the glass vessel is seated in the shock-absorbing cup and the cap is secured to the outer shell.

15. The portable beverage container of claim 14, further comprising a threaded structure on an inner surface of the outer metal shell, wherein the threaded structure is configured to engage with a corresponding threaded structure on the cap to secure the cap to the metal outer shell, and wherein the shock-absorbing ring is attached to an inner surface of the corresponding threaded structure on the cap.

16. The portable beverage container of claim 14, further comprising a foot secured to the shock-absorbing cup, wherein the foot is configured to protrude from an opening in the outer metal shell to form a non-slip bottom surface of the portable beverage container.

17. The portable beverage container of claim 14, further comprising an additional shock-absorbing ring attached to an inner surface of the metal shell.

18. A portable beverage container, comprising:
a rigid outer shell;
a glass inner vessel configured to be disposed at least partially within the rigid outer shell;
a cap configured to be secured to the rigid outer shell; and
a spout configured to be engaged with the cap and to extend through an opening in the cap into a narrowed neck of the glass inner vessel, wherein the spout is removable from the cap while the cap is secured to the rigid outer shell, wherein the cap comprises a locking feature configured to engage with a corresponding feature in the spout such that the spout is configured to lock rotationally with respect to the cap until release of the locking feature.

19. The portable beverage container of claim 18, wherein the spout comprises engagement features configured to lockingly engage with corresponding engagement features on the cap, while the spout is disposed in the opening of the cap.

20. The portable beverage container of claim 18, wherein the spout comprises at least one external fin configured to provide a grip for a user to disengage the spout for removal of the spout by a quarter turn of the spout.

21. The portable beverage container of claim 20, wherein the cap further comprises an alignment mark configured to indicate a location for the at least one external fin in the engaged position of the spout.

22. The portable beverage container of claim 18, further comprising:
an upper shock absorber configured to be compressed between the glass inner vessel and the rigid outer shell when the cap is secured to the rigid outer shell; and
a lower shock absorber configured to be disposed between the glass inner vessel and the rigid outer shell, wherein the upper shock absorber and the lower shock absorber each include drainage features that allow liquid to drain therethrough.

23. The portable beverage container of claim 22, wherein the lower shock absorber further includes a circumferential recess configured to receive a circumferential protrusion on a base portion of the glass inner vessel.

24. The portable beverage container of claim 23, wherein the lower shock absorber further comprises a recess configured to receive a rim on the rigid outer shell.

25. The portable beverage container of claim 18, further comprising a button in the cap, the button comprising a compression spring, a button member, and a pivotable finger mechanism, wherein the button member and the pivotable finger mechanism are biased outward by the compression spring.

26. The portable beverage container of claim 25, further comprising a slidable locking mechanism having a locking bar, wherein the button member further comprises:
at least one ridge configured to contact the locking bar to prevent actuation of the button member and the finger mechanism when the locking bar is in a locked position.

27. The portable beverage container of claim 18, wherein, when the locking feature rotationally locks the spout with respect to the cap, an opening of the spout is maintained at a fixed position with respect to a hinge of the cap.

28. The portable beverage container of claim 18, further comprising a release button that, when actuated, releases the locking feature of the cap from the corresponding feature in the spout.

29. The portable beverage container of claim 18, further comprising a spring configured to bias the locking feature toward the corresponding feature in the spout.

30. A portable beverage container of claim 18, comprising:
a rigid outer shell;
a glass inner vessel configured to be disposed at least partially within the rigid outer shell;
a cap configured to be secured to the rigid outer shell; and
a spout configured to be engaged with the cap and to extend through an opening in the cap into a narrowed neck of the glass inner vessel, wherein the spout is removable from the cap while the cap is secured to the rigid outer shell, wherein the cap comprises an elastomeric sealing member having a knob configured to extend into a recess in the spout, wherein the knob includes a ridge configured to extend into an opening in the recess.

31. The portable beverage container of claim 30, wherein the cap further comprises an inner surface and a protrusion on the inner surface, wherein the protrusion extends within the knob and is configured to push the ridge on the knob into the opening in the recess.

32. A portable beverage container of claim 18, comprising:
- a rigid outer shell;
- a glass inner vessel configured to be disposed at least partially within the rigid outer shell;
- a cap configured to be secured to the rigid outer shell; and
- a spout configured to be engaged with the cap and to extend through an opening in the cap into a narrowed neck of the glass inner vessel, wherein the spout is removable from the cap while the cap is secured to the rigid outer shell, wherein the cap comprises a base, a lid, and a hinge that rotatably mounts the lid to the base, wherein the hinge comprises:
    - a first hinge member mounted in the base, the first hinge member comprising a spring-loaded detent pin having a head with a protrusion; and
    - a second hinge member mounted in the lid, wherein the second hinge member comprises a hinge barrel having a notch configured to receive the protrusion.

* * * * *